United States Patent
Uehara et al.

(10) Patent No.: US 7,890,669 B2
(45) Date of Patent: Feb. 15, 2011

(54) COMPUTER SYSTEM FOR SHARING I/O DEVICE

(75) Inventors: Keitaro Uehara, Kokubunji (JP); Yuji Tsushima, Hachioji (JP); Toshiomi Moriki, Kokubunji (JP); Yoshiko Yasuda, Tokorozawa (JP)

(73) Assignee: Hitachi, Ltd., Tokyo (JP)

( * ) Notice: Subject to any disclaimer, the term of this patent is extended or adjusted under 35 U.S.C. 154(b) by 994 days.

(21) Appl. No.: 11/561,557

(22) Filed: Nov. 20, 2006

(65) Prior Publication Data
US 2007/0143395 A1    Jun. 21, 2007

(30) Foreign Application Priority Data

Nov. 25, 2005 (JP) ............................. 2005-340088
Jul. 14, 2006 (JP) ............................. 2006-194534

(51) Int. Cl.
*G06F 13/28* (2006.01)
(52) U.S. Cl. ......................................... 710/22; 710/26
(58) Field of Classification Search .................. 710/22, 710/26
See application file for complete search history.

(56) References Cited

U.S. PATENT DOCUMENTS

| | | | |
|---|---|---|---|
| 6,496,847 | B1 | 12/2002 | Bugnion et al. |
| 2002/0129212 | A1* | 9/2002 | Lee et al. ................... 711/152 |
| 2003/0172149 | A1* | 9/2003 | Edsall et al. ............... 709/224 |
| 2004/0098544 | A1* | 5/2004 | Gaither et al. .............. 711/154 |
| 2004/0153853 | A1 | 8/2004 | Moriki et al. |
| 2005/0097384 | A1 | 5/2005 | Uehara et al. |
| 2005/0235068 | A1 | 10/2005 | Moriki et al. |
| 2005/0235083 | A1 | 10/2005 | Tsushima et al. |
| 2006/0064523 | A1 | 3/2006 | Moriki et al. |
| 2006/0253619 | A1* | 11/2006 | Torudbakken et al. ......... 710/31 |

FOREIGN PATENT DOCUMENTS

JP    2004-220218    8/2004

OTHER PUBLICATIONS

U.S. Appl. No. 11/490,141, filed Jul. 2006, Tarui, et al.
"Intel® Virtualization Technology for Directed I/O Architecture Specification", Feb. 2006. Order No. D51397-001, http://www.intel.com/technology/computing/vptech/.

* cited by examiner

*Primary Examiner*—Alford W Kindred
*Assistant Examiner*—David E Martinez
(74) *Attorney, Agent, or Firm*—Brundidge & Stanger, P.C.

(57) ABSTRACT

Provided is a computer system in which an I/O card is shared among physical servers and logical servers. Servers are set in advance such that one I/O card is used exclusively by one physical or logical server, or shared among a plurality of servers. An I/O hub allocates a virtual MM I/O address unique to each physical or logical server to a physical MM I/O address associated with each I/O card. The I/O hub keeps allocation information indicating the relation between the allocated virtual MM I/O address, the physical MM I/O address, and a server identifier unique to each physical or logical server. When a request to access an I/O card is sent from a physical or logical server, the allocation information is referred to and a server identifier is extracted from the access request. The extracted server identifier is used to identify the physical or logical server that has made the access request.

6 Claims, 33 Drawing Sheets

| PHYSICAL I/O CARD ID (741) | I/O CARD TYPE (742) | SERVER 1 (743B) | SERVER 2 (743B) | ... | SERVER n (743N) |
|---|---|---|---|---|---|
| 1 | FC HBA | SHARED (IN USE) | SHARED (NOT IN USE) | | PROHIBITED |
| 2 | NIC | SHARED (IN USE) | PROHIBITED | | SHARED (NOT IN USE) |
| 3 | SCSI | EXCLUSIVE (IN USE) | PROHIBITED | | PROHIBITED |
| | | | | | |

I/O CARD SHARING ATTRIBUTES 743

I/O CARD SHARING SETTINGS 740

FIG. 4

| 741 | 1232 | 1233 | 1234 | 1235 |
|---|---|---|---|---|
| PHYSICAL I/O CARD ID | STARTING MM I/O ADDRESS | ADDRESS RANGE | MAXIMUM SHARING GUEST COUNT | USE STATE |
|  |  |  |  |  |
| 1 | A | R | 4 | 0101 |
| 2 | H | S | 2 | 00 |
|  |  |  |  |  |

MM I/O AREA ALLOCATION TABLE 1230

FIG. 11

| 1104 | 1113 | 1125 | 1200 |
|---|---|---|---|
| VIRTUAL MM I/O ADDRESS | PHYSICAL MM I/O ADDRESS | GUEST IDENTIFIER | I/O P MEMORY ADDRESS |
|  |  |  |  |
| B | A | SERVER 1 | P |
| C | A | SERVER 2 | Q |
|  |  |  |  |

MM I/O ADDRESS CONVERSION TABLE 720

FIG. 12

411 ADDRESS INFORMATION TABLE

| HEADER | MM I/O ADDR | I/O P ADDR | OFFSET |
|---|---|---|---|
| I/O 1:SV1 | 0xA | 0xP | 0xX |
| I/O 1:SV2 | 0xB | 0xQ | 0xY |
| I/O 1:SV3 | 0xC | 0xR | 0xZ |
|  |  |  |  |

4111  4112  4113  4114

610  I/O CARD SHARING SETTINGS TABLE

|  | TYPE | SERVER 1 | SERVER 2 | SERVER 3 | ......... |
|---|---|---|---|---|---|
| I/O CARD 1 | SCSI CARD | SHARE | SHARE | SHARE | ......... |
| I/O CARD 2 | NIC CARD | NO ASSIGNED | DEDICATE | NO ASSIGNED | ......... |

COMPUTER SYSTEM FOR SHARING I/O DEVICE

CLAIM OF PRIORITY

The present application claims priority from Japanese applications JP2006-194534 filed on Jul. 14, 2006 and JP2005-340088 filed on Nov. 25, 2005, the contents of which are hereby incorporated by reference into this application.

BACKGROUND

This invention relates to a computer system in which a plurality of servers are integrated into one, and more particularly, to a computer system in which an I/O card is shared between a physical server and a logical server.

Recent improvement of computer performance, especially the progress of multicore processor technology, has contributed to increased adoption of a cost reduction method in which processing that has conventionally been distributed among a plurality of servers is concentrated into one server. An effective way to concentrate processing in a server is to run a plurality of operating systems on one server by utilizing server partitioning.

Server partitioning is classified into physical partitioning which allocates OSs on a node basis, "node" being a processor, a memory, or the like, and logical partitioning which virtualizes a physical processor and a physical memory to create an arbitrary number of logical partitions in a computer. Physical partitioning and logical partitioning each have advantages and disadvantages.

With physical partitioning, it is not possible to partition a server into more pieces than the number of physical resources included in the server, and therefore only a limited number of servers can be integrated into one. On the other hand, since servers integrated by physical partitioning each have exclusive use of a hardware resource, the server performance is high.

Logical partitioning is implemented by firmware called hypervisor or virtualization software. In logical partitioning, operating systems (called guest OSs) are executed on logical processors provided by a hypervisor. With a plurality of logical processors mapped onto a physical processor by the hypervisor, the unit of partitioning is finer than a node. Furthermore, when it is a processor that is partitioned, one physical processor may be switched in a time-sharing manner among a plurality of logical partitions. In this way, more logical partitions than the number of physical processors can be created and run concurrently with one another. However, in the logical partitioning, the intervention of virtualization software causes overhead, which makes logical partitioning inferior to physical partitioning in terms of performance.

Thus physical partitioning and logical partitioning each have advantages and disadvantages, and it is therefore desirable to combine the two flexibly to suit the purpose.

Server integration utilizing those physical server partitioning and logical server partitioning has the following problems.

First of all, the above type of server integration requires an I/O card for each server, and the number of servers that can be integrated is limited by the number of I/O cards that can be mounted. A problem second to this is that the server integration can degrade the overall system performance in some cases.

Prior art given below is known as solutions to the above-mentioned problems.

JP 2004-220218 A discloses a technique for preventing the I/O performance of a logically partitioned server from dropping. This technique accomplishes direct memory access, DMA, from an I/O card in a logical server environment by preparing a conversion table for conversion between a guest DMA address shown to a logical server and a host DMA address in main storage.

A similar technique is disclosed in an online article, Intel Corporation, "Intel Virtualization Technology for Directed I/O Architecture Specification" retrieved Jul. 6, 2006 at an Internet URL http://www.intel.com/technology/computing/vptech/. This technique involves extended application to I/O devices of Translation Look-aside Buffer (TLB), which is a mechanism for converting a virtual address into a physical address when a processor accesses memory. By entering different conversion entries for different I/O devices, the same guest DMA address can be converted into different host DMA addresses.

In addition to the above-mentioned hypervisor, server virtualization software disclosed in U.S. Pat. No. 6,496,847 is another known example of software that partitions one computer into an arbitrary number of logical partitions. The server virtualization software makes sure that a host OS intervenes I/O access from a logical server (guest), thereby enabling a plurality of logical servers to share an I/O card. The number of necessary I/O cards can thus be reduced among logical servers.

SUMMARY

The above prior art can solve one of the two problems mentioned above, but not both of them at the same time.

JP 2004-220218 A is built on the premise that I/O cards and logical servers are on a one-on-one basis, and a logical server is identified by an I/O card from which a DMA request is made. JP 2004-220218 A is therefore not applicable to a computer system in which an I/O card is shared.

In a computer where an I/O is accessed via a host OS as in U.S. Pat. No. 6,496,84, DMA transfer from an I/O requires memory copy between the host OS and a guest OS, which makes lowering of performance due to increased overhead unavoidable. To elaborate, since I/O access between a guest OS and an I/O card is always relayed by the host OS, such cases as DMA transfer between a guest OS and an I/O card require processing of transferring data from a memory area of the host OS to a memory area of the guest OS and the host OS processing causes overhead that lowers the I/O access performance (transfer rate and response).

This invention has been made in view of those problems, and it is therefore an object of this invention to share an I/O card among a plurality of servers while avoiding lowering of I/O access performance, and to provide a computer system that accomplishes DMA transfer despite sharing of an I/O card among a plurality of physical servers and logical servers.

According to an aspect of this invention, a computer system includes: at least one node composed of at least one processor and memory; an I/O hub connecting at least one I/O card; a switch connecting the node and the I/O hub; and a server run by one or a plurality of the at least one node, in which the server is set in advance to allow one of exclusive use and shared use of the I/O; the I/O hub allocates a virtual MM I/O address unique to each server to a physical MM I/O address associated with an I/O card; the I/O hub keeps allocation information indicating the relation between the allocated virtual MM I/O address, the physical MM I/O address, and a server identifier unique to the server; and, when one server sends a request to access an I/O card, the I/O hub refers to the allocation information to identify the server that has issued the access request using a server identifier that is extracted from the access request.

This invention enables a plurality of servers to share an I/O card. This eliminates the limitation on the number of servers integrated which has been limited by how many I/O cards can be mounted to a computer system, and can lead to more flexible server configuration and effective use of hardware resources.

This invention also makes DMA transfer from an I/O card possible irrespective of whether an I/O card is shared or not, which can reduce adverse effect on performance even when an I/O card is shared among a plurality of servers.

BRIEF DESCRIPTION OF THE DRAWINGS

FIG. 4 is an explanatory diagram of an example of I/O card sharing settings according to the first embodiment of this invention.

FIG. 11 is an explanatory diagram of an example of an MM I/O area allocation table according to the first embodiment of this invention.

FIG. 12 is an explanatory diagram of an example of an MM I/O address conversion table according to the first embodiment of this invention.

FIG. 29 is an explanatory diagram showing an example of an I/O card sharing settings table according to the third embodiment of this invention.

DETAILED DESCRIPTION OF THE PREFERRED EMBODIMENTS

Figure 1:
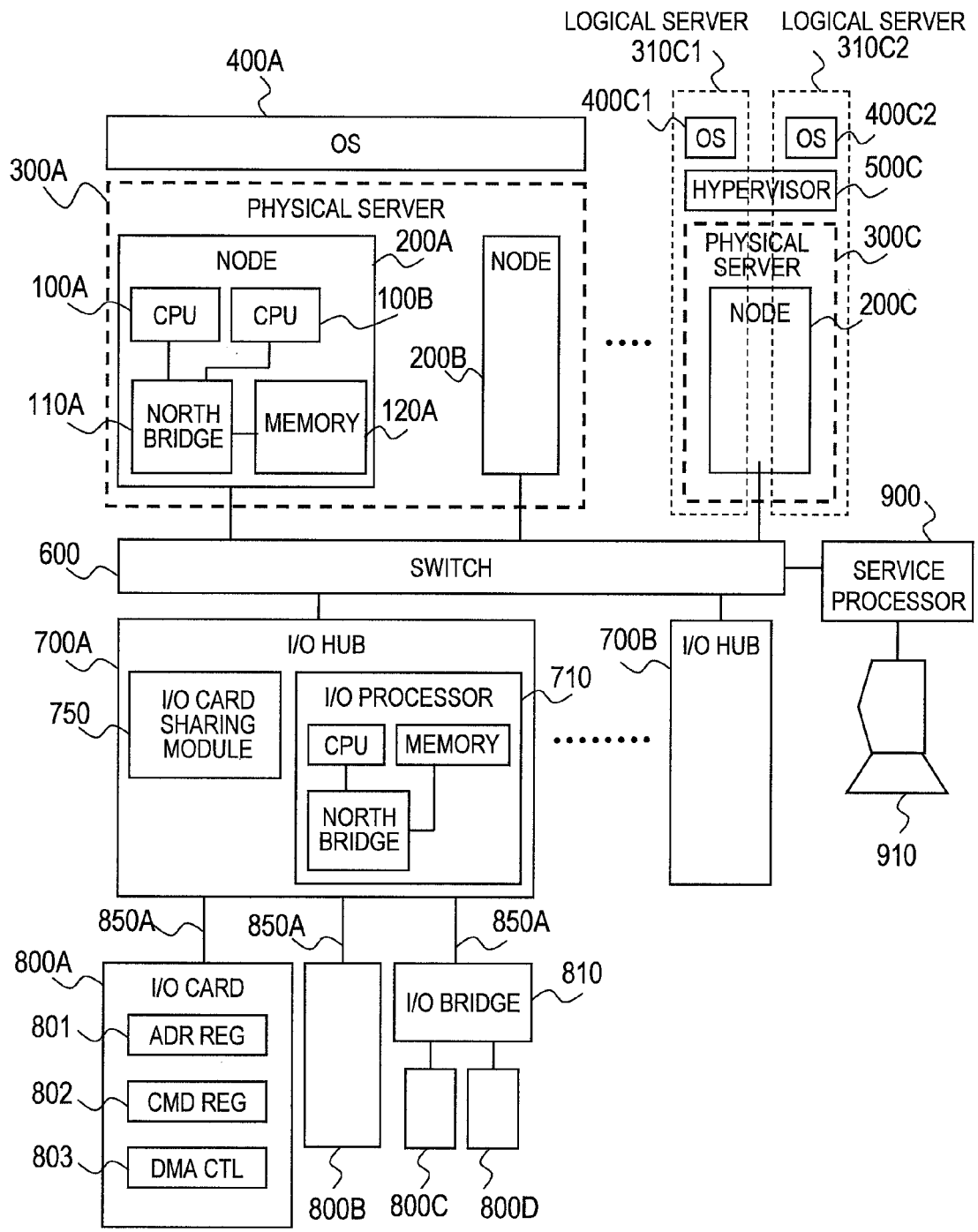
FIG. 1 is a configuration block diagram of a computer system according to a first embodiment of this invention.

Hereinafter, embodiments of this invention will be described with reference to the accompanying drawings.

First Embodiment

First, the outline of a first embodiment of this invention will be described.

A computer system according to the first embodiment of this invention is configured such that a plurality of physical servers and a plurality of I/O hubs are connected to each other via a switch. It should be noted that the physical server may include a plurality of logical servers configured by a hypervisor. On each of the physical servers and logical servers, an operating system (hereinafter, referred to as "OS") is run, and an application is run on the OS. It should be noted that the OS which is run on each of the physical servers and logical servers, and each application which is run on the OS are called "guest".

The I/O hub has an I/O card and an I/O bridge connected thereto. A plurality of I/O cards can be connected to the I/O hub via the I/O bridge. The I/O hub includes an I/O processor having a function of monitoring an access to a memory mapped I/O (MM I/O) area of the I/O card, and arbitrating the access in a case where two or more guests access the same I/O card. The I/O processor is composed of a dedicated processor and memory provided in the I/O hub. It should be noted that the I/O processor may be realized by a part of resources of the physical servers or the logical servers in the computer system.

The computer system is connected to a service processor (hereinafter, referred to as "SVP") so that the SVP can communicate with the physical servers and the I/O cards. The SVP sets mapping between the physical servers and the logical servers, and the I/O cards used by the physical servers and the logical servers in response to an instruction from an administrator or a user. It should be noted that the SVP includes a setting console which accepts settings by the administrator or the user.

Next, the outline of an operation of this invention will be described.

First, when the computer system is initialized, the MM I/O area associated with the I/O card to be used by the physical servers and the logical servers is secured in a memory space by firmware or the hypervisor. According to this invention, by the hypervisor or the firmware, a virtual MM I/O area is secured with respect to the I/O card which may be shared by a plurality of guests. The virtual MM I/O area is shown to the respective guests. The guests access the virtual MM I/O area, thereby making it possible to access an allocated I/O card. The virtual MM I/O area is partitioned into pieces according to the number of guests sharing the I/O card. Different guests are each surely allocated with a different MM I/O address.

The I/O hub has a conversion table containing virtual MM I/O addresses, physical I/O addresses which are real MM I/O addresses of the I/O cards, and guest identifiers for identifying each guest.

After that, an access to the I/O card from the guests is executed. In this case, each guest issues an access to the virtual MM I/O address. The I/O hub refers to the conversion table, and converts the virtual MM I/O address into the physical MM I/O address and into the guest identifier. Thus, the I/O hub can identify each guest.

Next, in order to accomplish a direct memory access (DMA) transfer from the I/O card shared by the guests, the following processing is executed by using the guest identifiers.

The I/O processor traps write in the MM I/O area unique to the I/O card. The trapped write in the MM I/O area is redirected to a memory area (i.e., I/O P memory) exclusively used by the I/O processor, whereby data is written in the MM I/O area. Among the writes, with regard to an access in association with a setting of a DMA address, the guest identifier is buried in a significant bit (or higher-order bit) of a physical address to be set, thereby making it possible to identify each guest of a requester of the subsequent DMA access.

Upon trapping the access to a command register, the I/O processor transfers contents of the redirected memory area to a corresponding physical MM I/O area. As a result, the actual access to the I/O card is executed, and a request for DMA is set.

Upon receiving the setting of the request for DMA, the I/O card starts the DMA transfer. In this case, the I/O hub extracts the guest identifier from the significant bit of the address for the DMA transfer, refers to a guest conversion table, and converts the guest physical address into a host physical address, thereby making it possible to accomplish DMA in which the I/O card directly accesses the guest.

FIG. 1 is a configuration block diagram of an example of a computer system according to the first embodiment of this invention.

In the computer system shown in FIG. 1, one or more physical servers 300 (300A to 300C) and one or more logical servers 310 (310C1, 310C2) configured by the physical servers 300 are connected to each other via a switch 600.

The physical server 300 is composed of one or more nodes 200 (200A to 200C). Each node 200 includes one or more CPUs 100 (100A, 100B), a memory 120A, and a north bridge 110A. The CPUs 100 and the memory 120A are connected to each other via the north bridge 110A.

It should be noted that the CPU 100 may be configured such that the CPU 100 has a function corresponding to the north bridge 110A and the CPU 100 and the memory 120A are directly connected to each other. The following description applies to either of the cases. The following description also holds true of a multi-core CPU which includes a plurality of CPU cores in a single CPU 100.

In addition, it is possible to configure a single physical server 200 by a plurality of nodes 200. In this case, the plurality of nodes 200 are connected to one another via the switch 600, and a symmetric multiple processor (SMP) is composed of the CPUs 100 in the plurality of nodes 200.

Further, a hypervisor 500C is operated on a single physical server 300, and the resource of the physical server 300 is partitioned through processing of the hypervisor 500C, thereby making it possible to operate a plurality of logical servers 310 on the single physical server 300. An OS 400 (400A to 400C2) is operated on each of the plurality of logical servers 310. The respective logical servers 310 exclusively use a computer resource of the node 200 run on the physical server 300, that is, a part of the CPU 100 or the memory 120A. Alternatively, the computer resource is shared in a time-sharing manner.

The switch 600 is connected to one or more I/O hubs 700 (700A, 700B). Each I/O hub 700 is connected to a plurality of I/O cards 800 (800A to 800D) via one or more I/O buses 850. In addition, the I/O hub 700 may be connected to further more I/O cards 800 via an I/O bridge 810.

The I/O card 800 includes a direct memory access (DMA) controller (DMA CTL) 803 for directly accessing a memory address space of the physical server 300 or the logical server 310. The I/O card 800 includes a base address register (ADR REG) 801 for specifying a base address of the MM I/O of the physical server 300 or the logical server 310 for executing DMA by the DMA CTL 803, and a command register (CMD REG) 802 for specifying a request for the I/O card 800. The DMA CTL 803 executes the operation corresponding to the command written in the CMD REG 802 with respect to the address written in the ADR REG 801. It should be noted that the I/O card 800 includes a register (not shown) (e.g., a configuration register or a latency timer register) conforming to the PCI standard.

It should be noted that the I/O bus 850 may be a link through which the I/O cards 800 are each connected to the I/O bus 850 one-on-one basis similarly to a PCI-Express, or a link through which a plurality of I/O cards 800 are connected to a single bus similarly to a PCI bus. In any case, the following description applies to either of the cases.

The switch 600 provides flexibility which enables the access from the physical server 300 or the logical server 310 to an arbitrary I/O card 800.

The I/O hub 700 includes an I/O card sharing module 750 and an I/O processor 710.

The switch 600 is connected to a SVP 900 for managing the entire configuration of the computer system. The SVP 900 is connected to a setting console 910 via a management network 920. An administrator of the system configuration uses the setting console 910 to set the entire configuration of the computer system, and more particularly, to set arrangement or partition of the physical server 300 and the logical server 310, allocation of the I/O card with respect to the physical server 300 or the logical server 310, and the like.

In the example shown in FIG. 1, two nodes 200 (i.e., node 200A and node 200B) constitute the SMP, to thereby constitute a physical server 300A. On the physical server 300A, an OS 400A is run.

Further, a node 200C constitutes a physical server 300C. On the physical server 300C, a hypervisor 500C is run. The hypervisor 500C constitutes a logical server. As a result, the physical server 300C is partitioned into two logical servers, that is, a logical server 310C1 and a logical server 310C2. An OS 400C1 is run on the logical server 310C1, and an OS 400C2 is run on the logical server 310C2.

The switch 600 connects two I/O hubs 700 (i.e., I/O hub 700A and I/O hub 700B) to each other. The I/O hub 700A is connected to a plurality of I/O cards 800 via one or more I/O buses 850. An I/O bus 850A is connected to an I/O card 800A, and an I/O bus 850B is connected to an I/O card 800B. Further, The I/O bus 850C connects two I/O cards 800C and 800D via the I/O bridge 810.

Figure 2:
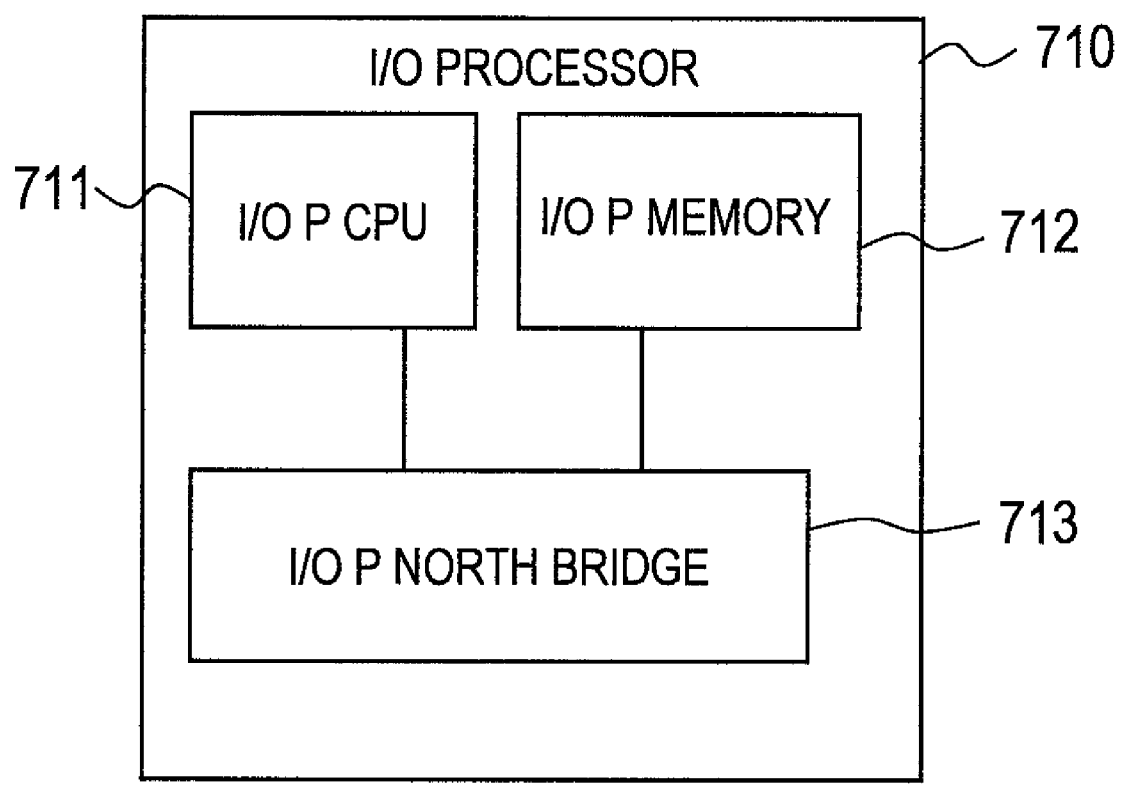
FIG. 2 is a configuration block diagram of an I/O processor according to the first embodiment of this invention.

FIG. 2 is a configuration block diagram of the I/O processor 710.

The I/O processor 710 monitors the I/O access, and executes conversion processing of the I/O access.

The I/O processor 710 includes an I/O P CPU 711, an I/O P memory 712, and an I/O P north bridge 713. The I/O P CPU 711 and the I/O P memory 712 are connected to each other via the I/O P north bridge 713.

In the above-mentioned example of FIG. 1, the I/O processor 710 is provided in the I/O hub 700, but the I/O processor may be provided separately from the I/O hub 700 to be independently connected to the computer system via the switch 600. A part of the physical server 300 or the logical server 310 may provide a function corresponding to the I/O processor 710.

Figure 3:
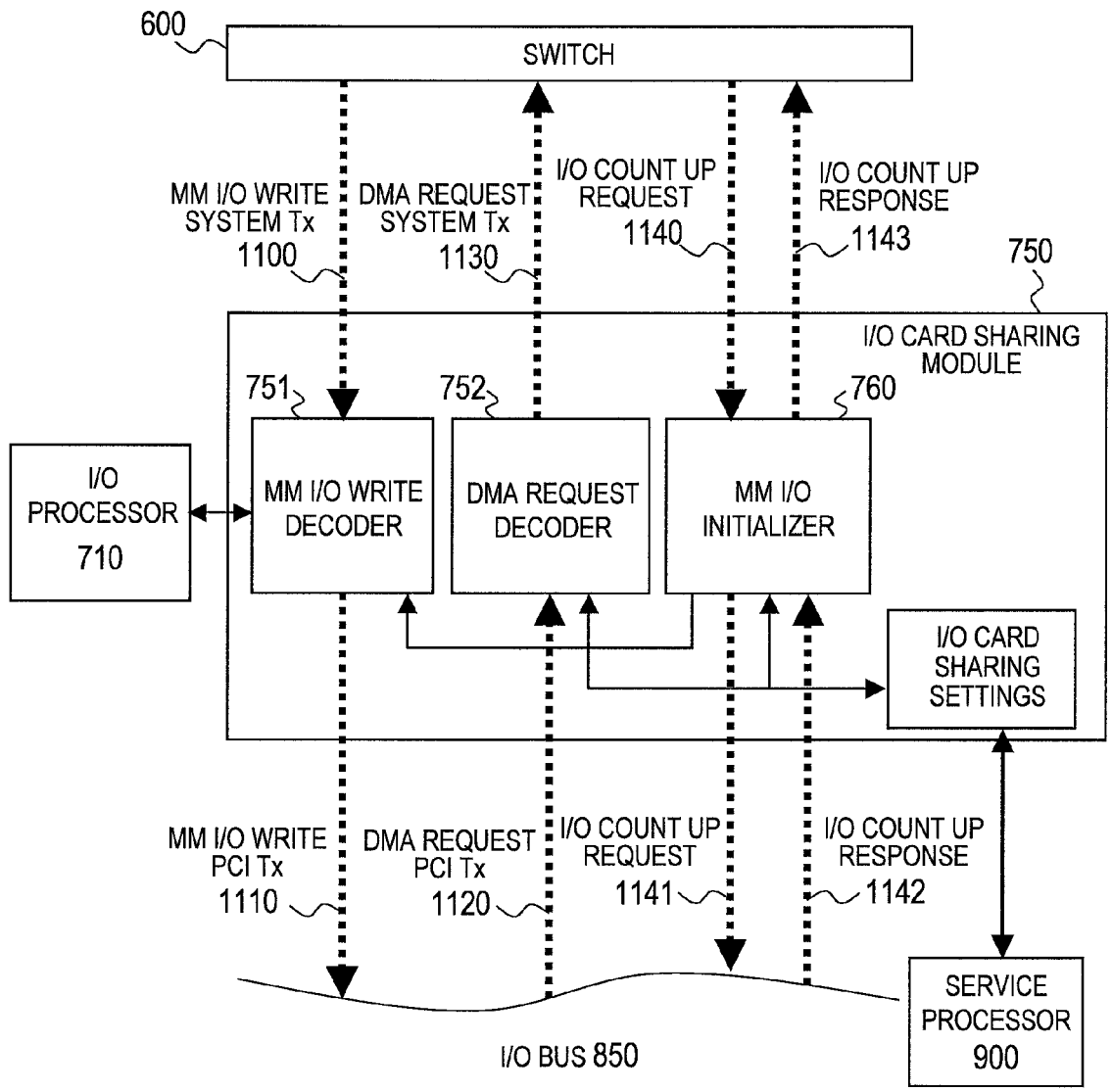
FIG. 3 is a function block diagram of an I/O card sharing module according to the first embodiment of this invention.

FIG. 3 is a function block diagram of the I/O card sharing module 750.

The I/O card sharing module 750 includes an MM I/O write decoder 751, a DMA request decoder 752, an MM I/O initializer 760, and I/O card sharing settings 740.

Upon receiving an MM I/O write system Tx 1100 transferred from the switch 600, the MM I/O write decoder 751 converts the MM I/O write system Tx 1100 into a memory write or an interruption with respect to the I/O processor 710. The MM I/O write decoder 751 also processes a field included in the MM I/O write system Tx 1100 to generate an MM I/O write PCI Tx 1100, and issues the generated MM I/O write PCI Tx 1100 to the I/O bus 850.

Upon receiving a DMA request PCI Tx 1120 transferred from the I/O bus 850, the DMA request decoder 752 identifies each issuer guest, converts the DMA address included in the DMA request PCI Tx 1120 to generate a DMA request system Tx 1130, and issues the generated DMA request system Tx 1130 to the switch 600.

Upon receiving an I/O count up request 1140 which has been issued from the hypervisor or the guest and transferred from the switch 600, the MM I/O initializer 760 issues an I/O count up request 1141 to the I/O card. Then, upon receiving an I/O count up response 1142 from the I/O card 800, the MM I/O initializer 760 refers to contents of the I/O count up response 1142 and contents of the I/O card sharing settings 740 to generate an I/O count up response 1143 with respect to the I/O count up request 1140. Then, the MM I/O initializer 760 issues the I/O count up response 1143 to the requester.

The I/O card sharing settings 740 hold a table in which shared or exclusive use is set for each I/O card 800 connected to the I/O hubs 850. The SVP 900 refers to or updates the table of the I/O card sharing settings 740.

FIG. 4 is an explanatory diagram of an example of the I/O card sharing settings 740.

The I/O card sharing settings 740 are composed of entries including a physical card ID field, an I/O card type field, and an I/O card sharing attribute field. The entries are set for each I/O card 800.

The physical card ID field stores a physical I/O card ID 741 which is an identifier of the I/O card 800. The I/O card type field stores an I/O card type 742 which is an identifier indicating the type of the I/O card 800. The I/O card sharing attribute field stores, in each of the physical servers or the logical servers, an attribute 743 which is an identifier indicating that the I/O card 800 is shared, exclusively used, or prohibited from being accessed by the server.

The example of FIG. 4 shows that, with regard to the I/O card 800 whose physical I/O card ID 741 is set to "1", the I/O card type 742 is "FC HBA". The I/O card 800 is shared by a server 1 and a server 2, but is prohibited from being accessed by a server N. In addition, FIG. 4 shows that the I/O card is used by the server 1, and the I/O card is not used by the server 2.

FIGS. 5 to 9 indicate a detailed content of each Tx sent/received to/from the I/O hubs 700.

Figure 5:
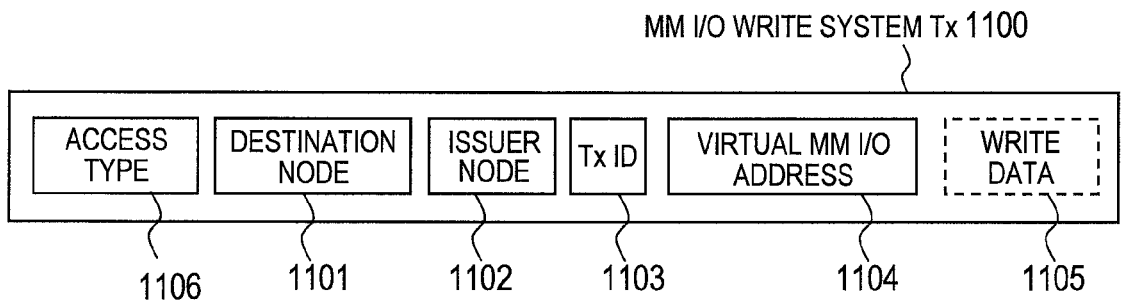
FIG. 5 is an explanatory diagram of an example of an MM I/O write system Tx according to the first embodiment of this invention.

FIG. 5 is an explanatory diagram of an example of the MM I/O write system Tx 1100.

The MM I/O write system Tx 1100 includes an access type field, a destination node field, an issuer node field, a Tx ID field, a virtual MM I/O address field, and a write data field.

The access type field stores an access type 1106 of the Tx. The access type 1106 is an identifier indicating that a destination of the access is a memory or an I/O, that the access is a read or a write, and the like. The MM I/O write system Tx 1100 stores the access type 1106 indicating that the access is a write in the MM I/O area.

The destination node field and the issuer node field store a destination node 1101 and an issuer node 1102 of the Tx. The destination node 1101 and the issuer node 1102 are used by the switch 600 for the routing. In the MM I/O write system Tx 1100 received by the I/O hub 700, the destination node 1101 is an identifier indicating the I/O hub 700.

The Tx ID field stores a Tx ID 1103 that is an identifier by which the issuer node can uniquely identify each transaction.

The virtual MM I/O address field stores a virtual MM I/O address 1104. The virtual MM I/O address 1104 is a virtual address of the I/O card to be accessed which is allocated to each requester guest of the MM I/O write system Tx 1100. It should be noted that a different register is usually allocated for each MM I/O address.

The write data field stores write data 1105 which is written in response to an instruction of the MM I/O write system Tx 1100.

Figure 6:
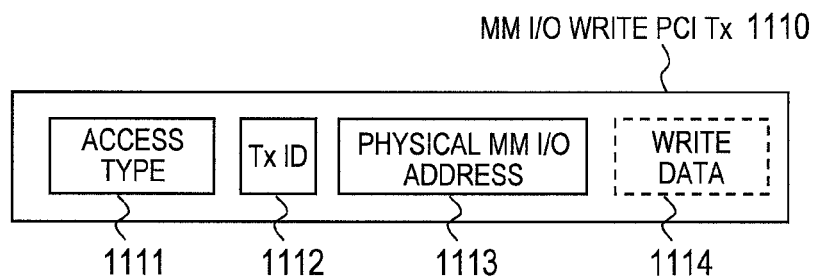
FIG. 6 is an explanatory diagram of an example of an MM I/O write PCI Tx according to the first embodiment of this invention.

FIG. 6 is an explanatory diagram of an example of the MM I/O write PCI Tx 1100.

The MM I/O write PCI Tx 1100 includes an access type field, a Tx ID field, a physical MM I/O address field, and a write data field.

The access type field stores an access type 1111 indicating that the transaction is an MM I/O write PCI Tx, and that the transaction is a write or a read.

The Tx ID 1112 stores a Tx ID 1112 that is an identifier by which the issuer node (in this case, the I/O hub 700) can uniquely identify each transaction.

The physical MM I/O address field stores a real MM I/O address 1113 (i.e., physical MM I/O address 1113) on the computer system of the I/O card 800 to be accessed.

The write data field stores write data 1114 to be written in response to an instruction of the MM I/O write PCI Tx 1110.

Figure 7:
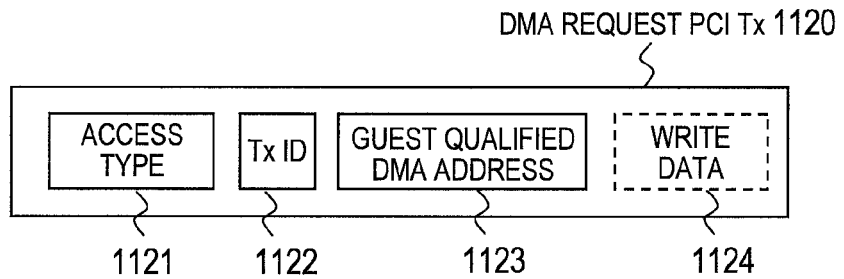
FIG. 7 is an explanatory diagram of an example of a DMA request PCI Tx according to the first embodiment of this invention.

FIG. 7 is an explanatory diagram of an example of the DMA request PCT Tx 1120.

The DMA request PCT Tx 112 includes an access type field, a Tx ID field, a guest qualified DMA address field, and a write data field.

The access type field stores an access type 1121 indicating that the transaction is the DMA request PCI Tx and the transaction is a write or a read.

The Tx ID field stores a Tx ID 1122 that is an identifier by which the issuer node (in this case, an I/O card or an I/O device) can uniquely identify each transaction.

The guest qualified DMA address field stores a guest qualified DMA address 1123 including a guest identifier and a DMA address. The guest qualified DMA address 1123 will be described with reference to FIG. 8.

The write data field stores write data 1124 to be written in response to an instruction of the DMA request PCI Tx only when the DMA request PCI Tx is a write transaction.

Figure 8:
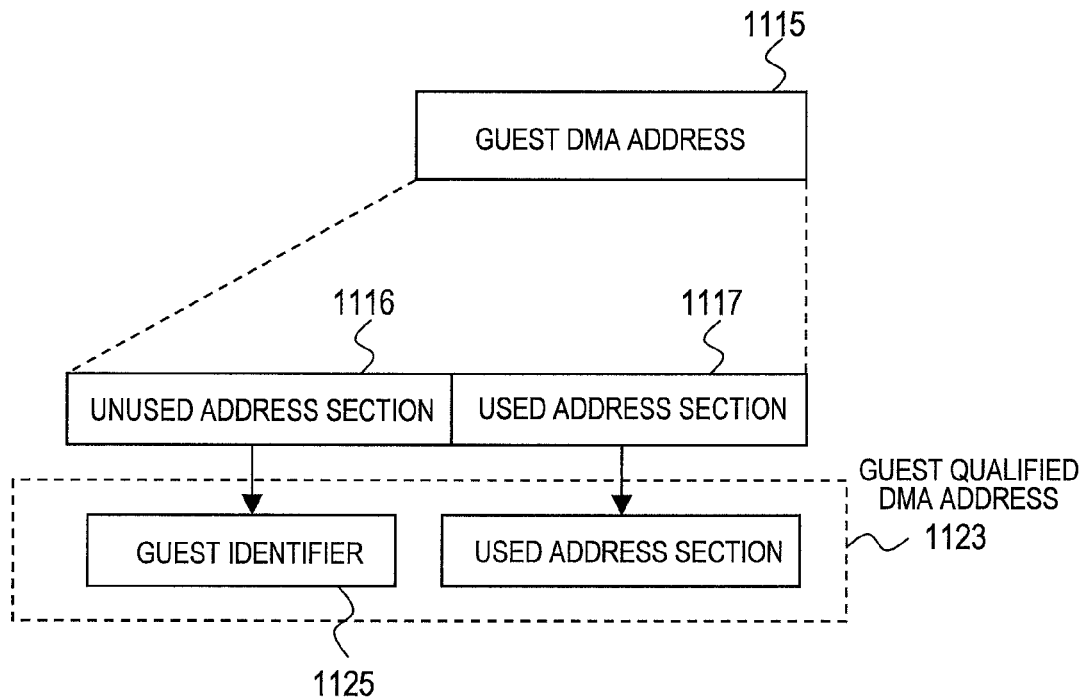
FIG. 8 is an explanatory diagram of a guest qualified DMA address according to the first embodiment of this invention.

FIG. 8 is an explanatory diagram of the guest qualified DMA address 1123.

A guest DMA address 1115 is an address of a main memory of a DMA transfer destination or a DMA transfer source recognized by the guest.

An address space of the PCI transaction has a size of 64 bits, and is generally much larger than a space of a physical memory to be actually mounted. Thus, the guest DMA address includes an unused address section 1116 in a significant bit part, in addition to a used address section 1117 which is actually used.

A guest identifier 1125 is buried in a part of or the whole of the unused address section 1116, thereby generating the guest qualified DMA address. Upon receiving the guest qualified DMA address, the request decoder 752 refers to the guest identifier 1125 buried in the guest qualified DMA address, to thereby identify the guest to be accessed.

Figure 9:
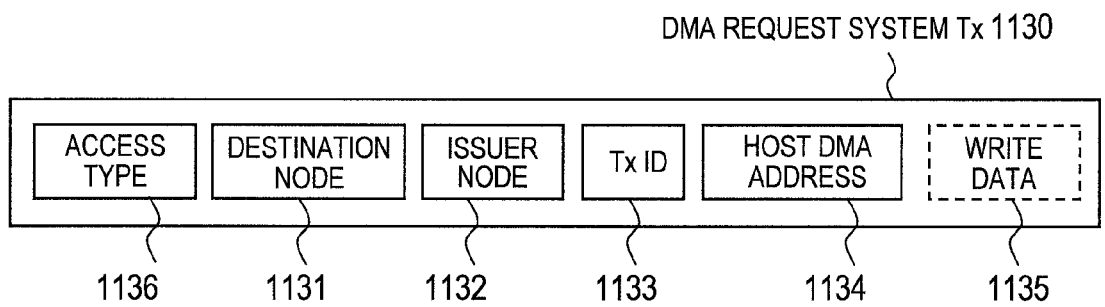
FIG. 9 is an explanatory diagram of an example of a DMA request system Tx according to the first embodiment of this invention.

FIG. 9 is an explanatory diagram of an example of the DMA request system Tx 1130.

The DMA request system Tx 1130 includes an access type field, a destination node field, an issuer node field, a Tx ID field, a host DMA address field, and a write data field.

The access type field stores an access type 1136 which indicates that the transaction is the DMA request system Tx whose access target is a memory, and that the transaction is a write or a read.

The destination node field stores a destination node 1311 which includes a memory associated with a destination of the Tx.

The issuer node field stores an issuer node 1132 of the Tx. It should be noted that in the DMA request system Tx 1130, the issuer node 1132 is the I/O hub 700.

The Tx ID field stores a Tx ID 1133 that is an identifier by which the issuer can uniquely identify each transaction.

The host DMA address field stores a host DMA address 1134 which is a physical address of a memory for actually executing DMA.

The write data field stores write data 1135 when the Tx is a write transaction.

Next, an operation of the I/O card sharing module 750 will be described.

Figure 10:
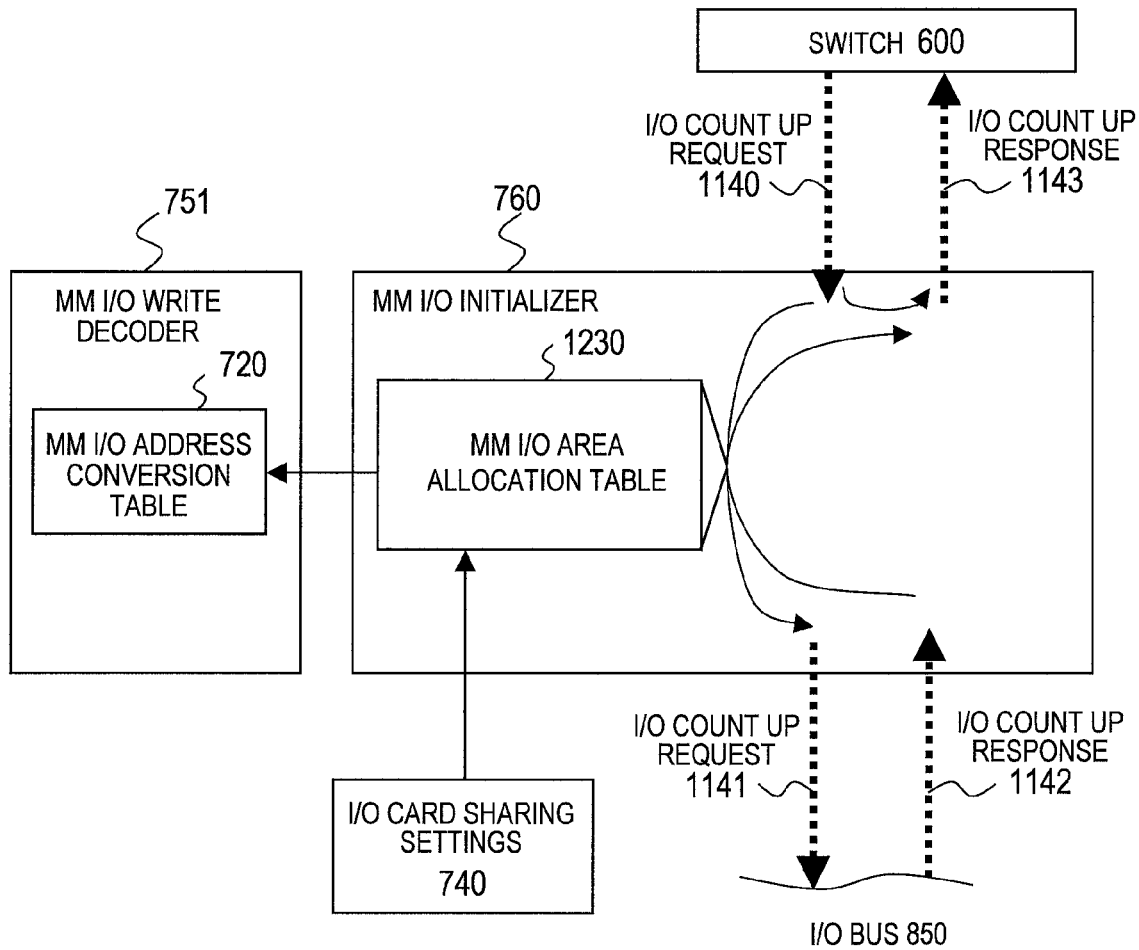
FIG. 10 is an explanatory diagram outlining initialization processing of an MM I/O initializer according to the first embodiment of this invention.

FIG. 10 is an explanatory diagram of the outline of initialization processing of the MM I/O initializer 760.

The MM I/O initializer 760 includes an MM I/O area allocation table 1230. The MM I/O area allocation table 1230 is initialized based on the I/O card sharing settings 740.

Upon receiving the I/O count up request 1140 from the guest, the MM I/O initializer 760 determines whether or not physical initialization processing for the I/O card 800 is required. In a case where the physical initialization processing for the I/O card 800 is required, the MM I/O initialize 760 issues the I/O count up request 1141 to the target I/O card.

Further, the MM I/O initializer 760 refers to the MM I/O area allocation table 1230 to determine the virtual MM I/O address to be allocated to the requester guest. Then, the MM I/O initializer 760 registers the determined virtual MM I/O address in the MM I/O address conversion table 720 which is contained in the MM I/O write decoder 751, and returns the virtual MM I/O address to the requester guest as the I/O count up response 1143.

FIG. 11 is an explanatory diagram of an example of the MM I/O area allocation table 1230.

The MM I/O area allocation table 1230 is composed of one or more entries which include a physical card ID field, a starting MM I/O address field, an address range field, a maximum sharing guest count field, and a use state field.

The physical card ID field stores a physical I/O card ID 741. The physical I/O card ID 741 has the same value as that of the physical card ID 741 of the I/O card sharing settings 740.

The starting MM I/O address field stores a starting MM I/O address 1231 which is an initial address of the MM I/O address of the I/O address card. The address range field stores an address range 1233 of the MM I/O area used by the I/O card.

The maximum sharing guest count field stores a maximum guest sharing count 1234 by which the I/O card can be shared.

The use state field stores a use state 1235 of the I/O card. The use state 1235 is represented as bitmaps for each guest which shares the I/O card. In a case of an ordinary use, the bits are set to 1, and in a case of an unused state, the bits are set to 0, respectively.

FIG. 12 is an explanatory diagram of an example of the MM I/O address conversion table 720.

The MM I/O address conversion table 720 is composed of one or more entries which include a virtual MM I/O address field, a physical MM I/O address field, a guest identifier field, and an I/O P memory address field.

The virtual MM I/O address field stores the virtual MM I/O address 1104 allocated to the guest. The physical MM I/O address field stores the physical MM I/O address 1113 associated with the virtual MM I/O address 1104. The guest identifier field stores the guest identifier 1125 of the guest which uses the virtual MM I/O address. The I/O P memory address field stores an I/O P memory address 1200 of the I/O P memory 712 allocated to the guest.

The I/O card sharing module 750 refers to the MM I/O address conversion table 720, to thereby mutually convert the virtual MM I/O address 1104, the physical MM I/O address 1113, the guest identifier 1125, and the I/O P memory address 1200.

Next, an operation of initialization processing of the MM I/O initializer 760 will be described.

Figure 13:
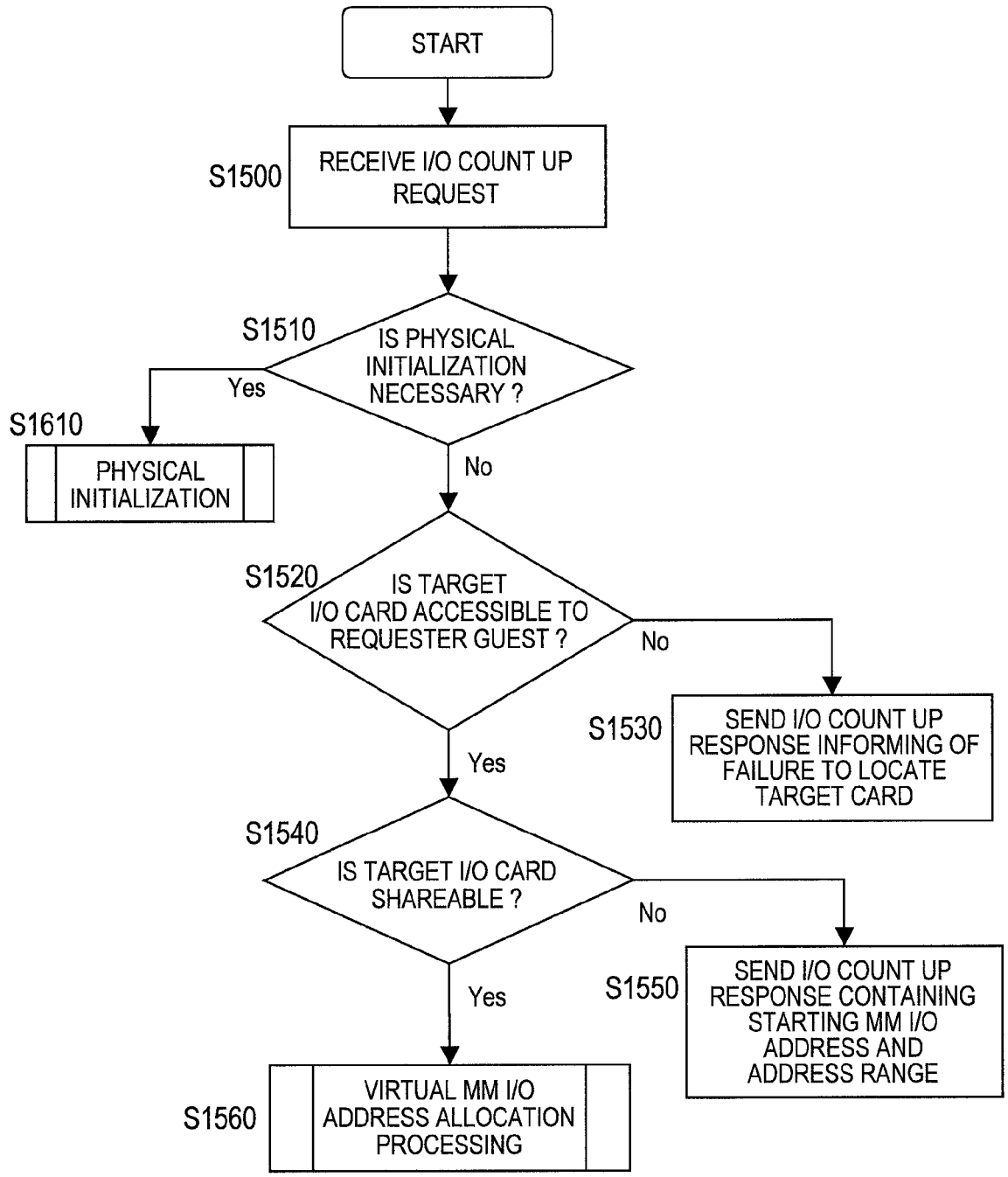
FIG. 13 is a flow chart for the initialization processing of the MM I/O initializer according to the first embodiment of this invention.
Figure 14:
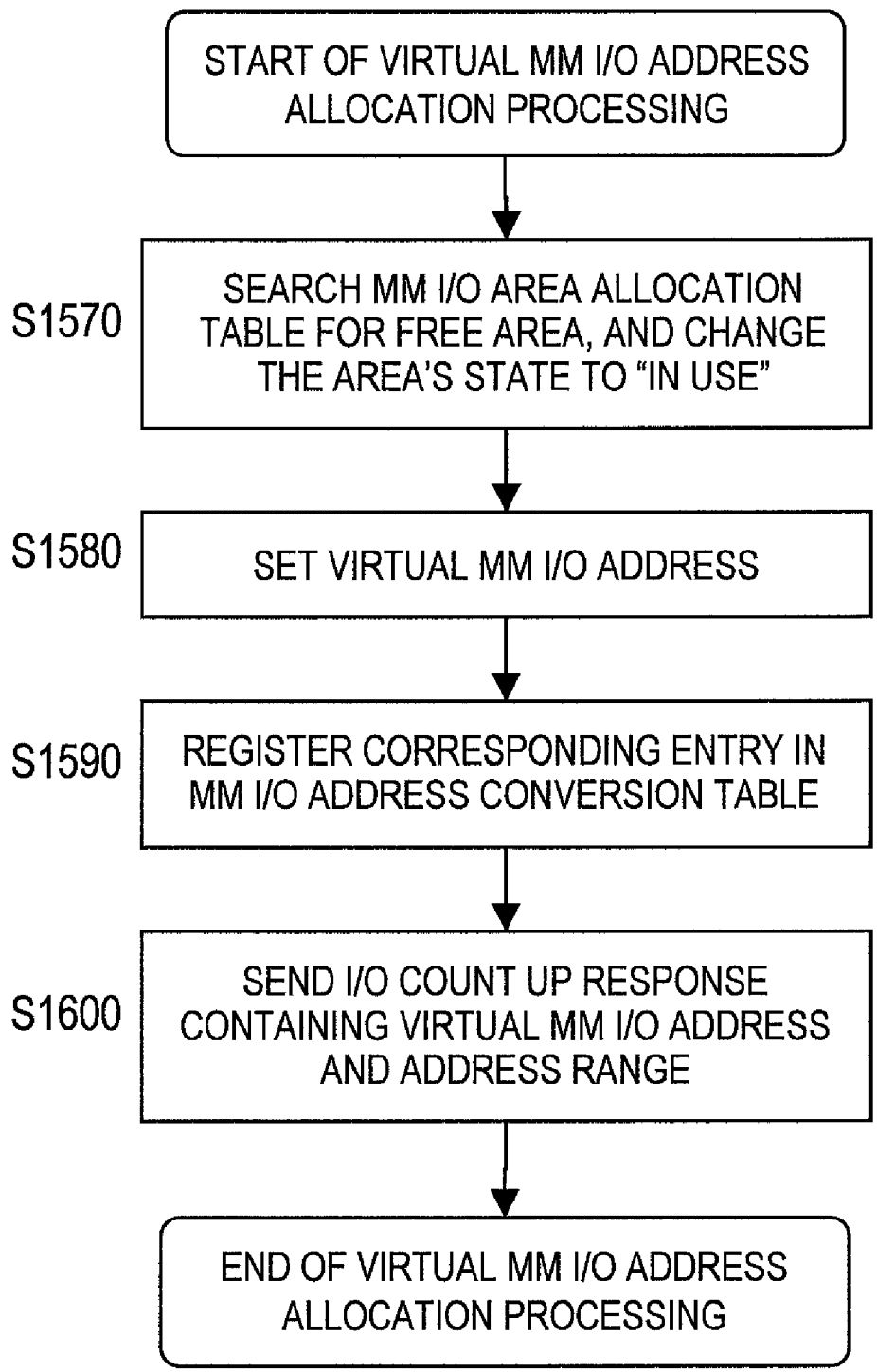
FIG. 14 is a flow chart for virtual MM I/O allocation processing according to the first embodiment of this invention.
Figure 15:
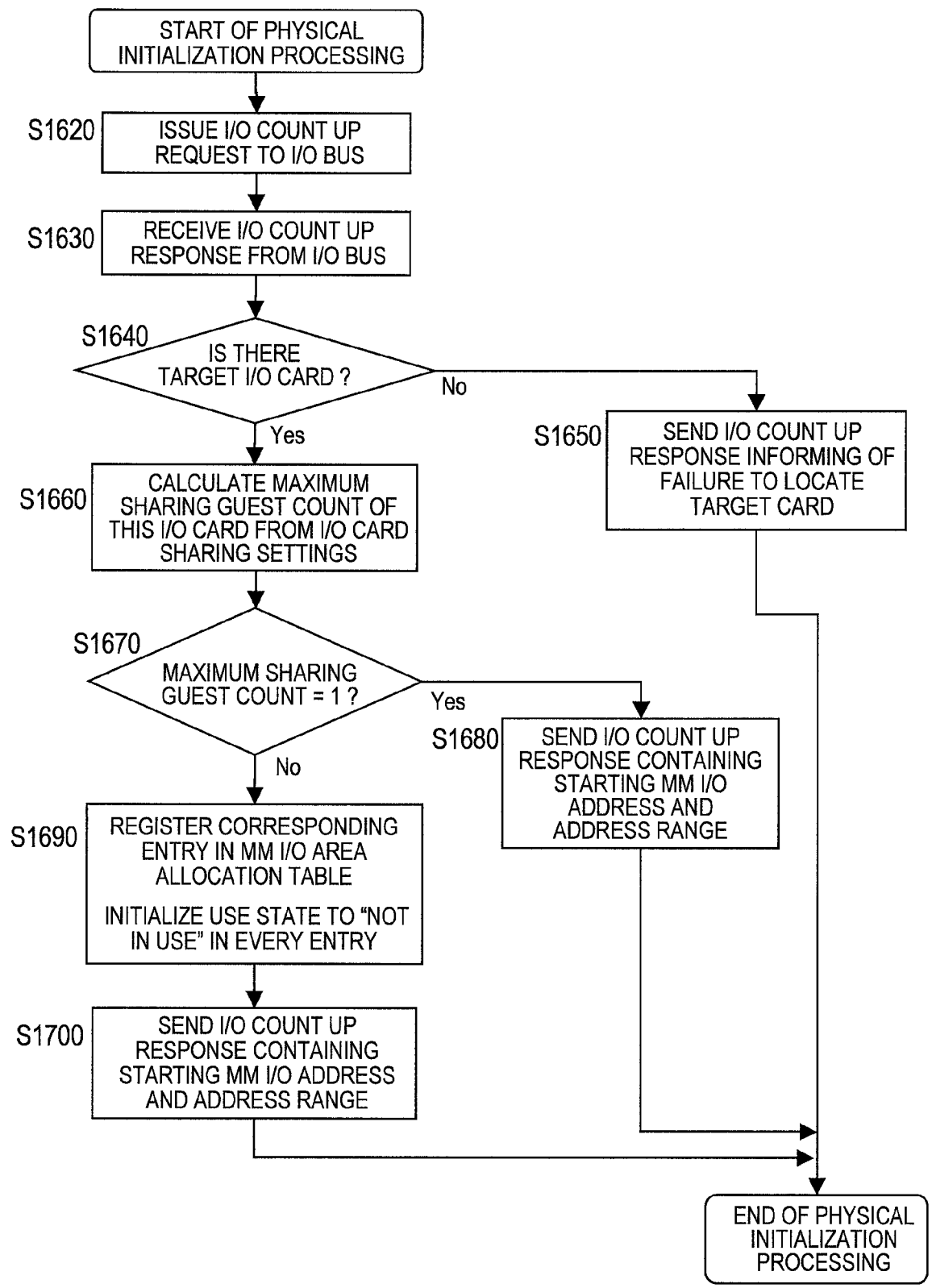
FIG. 15 is a flow chart for physical initialization processing according to the first embodiment of this invention.

FIGS. 13 to 15 are flowcharts of the initialization processing of the MM I/O initializer 760.

First, the MM I/O initializer 760 receives the I/O count up request 1140 via the switch 600 (Step S1500).

The I/O count up request 1140 is normally sent as a read request from the guest to a PCI configuration space.

To be specific, the guest allocates, to the PCI configuration space, a bus number, a device number, and a function number. In response to this, the MM I/O initializer 760 returns whether or not the corresponding device is present. As described later, in a case where the I/O card 800 corresponding to the device number is present, the MM I/O initializer 760 returns a base address and a size (i.e., area) of the MM I/O area of the corresponding device to the guest. In a case where the device corresponding to the device number is not present, the MM I/O initializer 760 returns a value (i.e., master abort) with bits all set to 1.

Next, the MM I/O initializer 760 determines whether or not the physical initialization processing is necessary (Step S1510). It should be noted that the physical initialization processing is executed only once for each physical I/O device, for example, immediately after the physical I/O device is reset or after the I/O configuration is changed. In a case where the physical initialization processing is not necessary, the process proceeds to Step S1520. In a case where the physical initialization processing is necessary, the process proceeds to Step S1610. It should be noted that processing of Sub-step S1610 will be described in detail later with reference to FIG. 15.

In Step S1520, the MM I/O initializer 760 determines whether or not the requester guest is accessible to the target I/O card. The MM I/O initializer 760 refers to the I/O card sharing settings 740 to obtain the I/O card sharing attribute of the requester guest associated with the target I/O card. When the I/O card sharing attribute is "prohibited", the requester guest is not permitted to access the target I/O. In a case where the requester guest is prohibited from accessing the target I/O, the process proceeds to Step S1530. In a case where the requester guest is permitted to access the target I/O, the process proceeds to Step S1540.

In Step S1530, the MM I/O initializer 760 sends, to the requester guest, the I/O count up response 1143 (i.e., master abort) indicating that the target I/O card is not present.

In Step S1540, the MM I/O initializer 760 determines whether or not the target I/O card can be shared. When the MM I/O initializer 760 indicates that the I/O card sharing attribute of the requester guest can be shared and that the I/O card is unused, the process proceeds to Sub-step S1560. In a case where the I/O card sharing attribute of the requester cannot be shared, the process proceeds to Step S1550.

In Step S1550, the MM I/O initializer 760 returns information of the physical I/O card to the I/O card of the requester which cannot be shared. The MM I/O initializer 760 obtains the starting MM I/O address and the address range of the I/O card from the MM I/O area allocation table 1230, and sends the starting MM I/O address and the address range to the requester guest as the I/O count up response 1143.

In Sub-step S1560, the virtual MM I/O address is allocated to the I/O card that can be shared. It should be noted that the processing of the Sub-step S1560 will be described in detail below with reference to FIG. 14.

FIG. 14 is a flowchart showing a virtual MM I/O assignment process of Sub-step S1560 shown in FIG. 13.

First, the MM I/O initializer 760 refers to the MM I/O area allocation table 1230 to obtain the use state 1235 of the I/O card 800. Then, the MM I/O initializer 760 searches for an unused index (i.e., bit) from the use state 1235. After the unused index is found, the area of the use state is changed into an area being used (Step S1570).

Next, the MM I/O initializer 760 refers to the MM I/O area allocation table 1230 to obtain a starting MM I/O address 1232 of the target I/O card. Then, based on the starting MM I/O address 1232 thus obtained, the MM I/O initializer 760 calculates the virtual MM I/O address 1104 (Step S1580).

To be specific, the address range 1233 is multiplied by a value obtained by adding 1 to an offset of an unused area, and the calculated value is added to the obtained starting MM I/O address 1232, to thereby obtain the virtual MM I/O address 1104. In other words, the virtual MM I/O address 1104 is calculated by the following calculating formula.

"virtual *MM I/O* address"="starting *MM I/O* address"+("address range"×("offset of unused capacity"+1))

By using the formula, the virtual MM I/O address is obtained.

Next, the MM I/O initializer 760 registers the virtual MM I/O address 1104 calculated in Step S1580 in the MM I/O address conversion table 720. The MM I/O initializer 760 creates a new entry in the MM I/O address conversion table 720. Then, the MM I/O initializer 760 registers the obtained virtual MM I/O address 1104 in the virtual MM I/O address field. Further, the MM I/O initializer 760 registers the obtained physical MM I/O address 1113 of the I/O address in the virtual MM I/O address field. In addition, MM I/O initializer 760 registers the guest identifier 1125 of the requester guest in the guest identifier field. Further, MM I/O initializer 760 secures an area associated with the address range 1233 in the I/O P memory 712, and registers the address to the I/O P memory address 1200 in the I/O P memory address field (Step S1590).

As a result, from then on, MM I/O initializer 760 can convert the virtual MM I/O address 1104 into the physical MM I/O address 1113 and extract the guest identifier 1125 by referring to the MM I/O address conversion table 720 of the MM I/O write decoder 751.

Next, the MM I/O initializer 760 sends the virtual MM I/O address 1104 obtained in Step S1580 and the address range 1233 to the requester guest as the I/O count up response 1143 (Step S1600). After that, the virtual MM I/O address assignment process is completed.

FIG. 15 is a flowchart showing the physical initialization processing of Sub-step S1610 shown in FIG. 14.

First, the MM I/O initializer 760 issues the I/O count up request 1141 to the I/O bus 850 (Step S1620).

Next, the MM I/O initializer 760 receives the I/O bus enumeration response 1142 from the I/O bus 850 (Step S1630).

The MM I/O initializer 760 determines whether or not the I/O card is present based on the I/O bus enumeration response 1142. In a case where the I/O card is not present, the process proceeds to Step S1650. In a case where the I/O card is present, the process proceeds to Step S1660.

In Step S1650, the MM I/O initializer 760 sends I/O count up response 1143 (i.e., master abort) indicating that the I/O is not present to the requester guest. Then, the physical initialization processing is completed.

In Step S1660, the MM I/O initializer 760 refers to the I/O card sharing settings 740 to obtain the maximum sharing guest count of the I/O card.

Next, the MM I/O initializer 760 determines whether or not the maximum sharing guest count is 1 (Step S1670). In a case where the maximum sharing guest count is 1, the process proceeds to Step S1680. In a case where the maximum sharing guest count is 2 or larger, the process proceeds to Step S1690.

When the maximum sharing guest count is 1, the I/O card is not shared. In other words, only the requester guest can exclusively use the I/O card. Thus, in Step S1680, the MM I/O initializer 760 sends the information included in the I/O count up response 1142 received in Step S1630 as it is to the requester guest as the I/O count up response 1143. Then, the physical initialization processing is completed.

In Step S1690, the MM I/O initializer 760 registers a new entry in the MM I/O area allocation table 1230. In the entry, the starting MM I/O address 1232 and the address range 1233, which are included in the and the I/O count up response 1142, and the maximum sharing guest count 1234 obtained in Step S1660 are registered. Then, the use state 1235 is initialized to a bitmap indicating that all the I/O cards are unused.

Next, the MM I/O initializer 760 sends the I/O count up response 1143 (Step S1700). The I/O count up response 1143 includes the MM I/O starting address 1232 and the address area 1233. The address area 1233 is a value obtained by multiplying the address range 1233 by a value obtained by adding 1 to the maximum sharing guest count 1234. In other words, the address ranger 1233 is calculated by the following calculating formula.

"address area"="address range"×(maximum sharing guest count+1)

Then, the physical initialization processing is completed.

By the above-mentioned process, the virtual MM I/O area for the maximum sharing guest count is reserved immediately after the physical MM I/O area.

Figure 16:
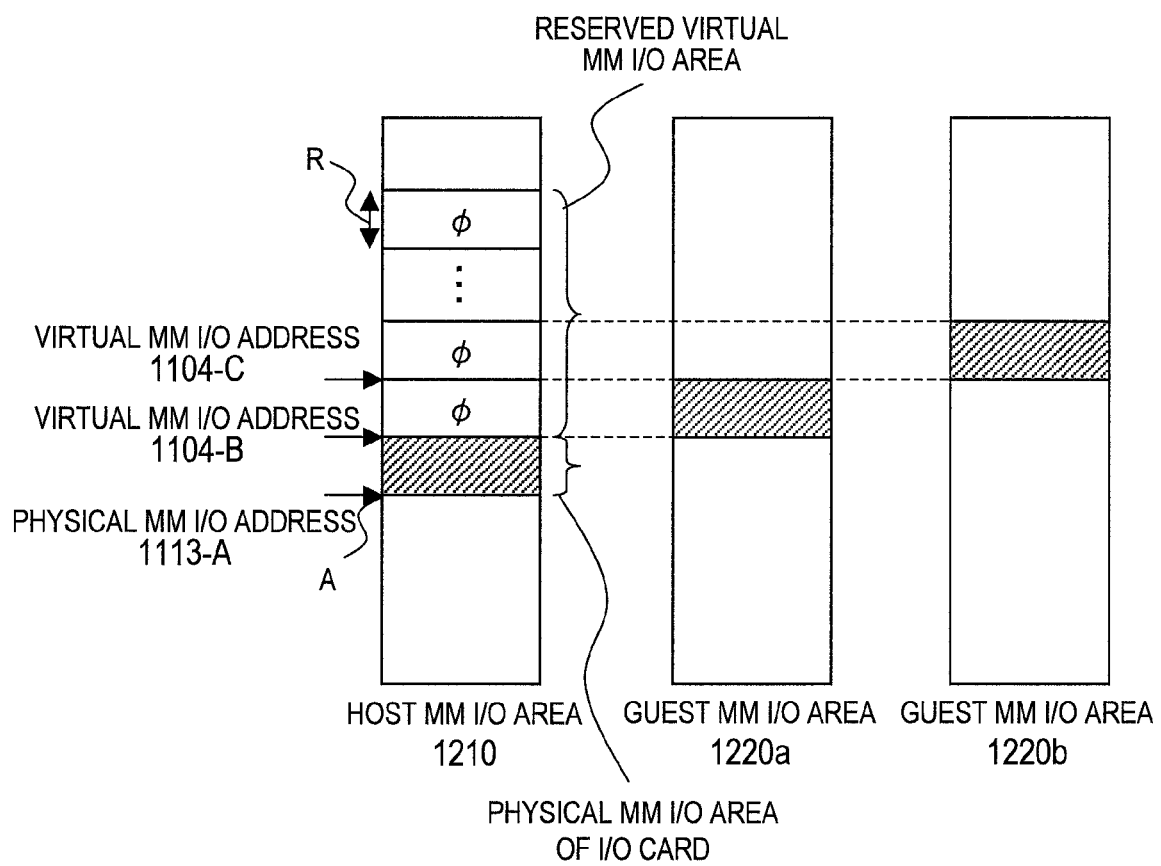
FIG. 16 is an explanatory diagram showing the relation between a virtual MM I/O address and a physical MM I/O address according to the first embodiment of this invention.

FIG. 16 is an explanatory diagram of a relationship between the virtual MM I/O address and the physical MM I/O address.

It should be noted that FIG. 16 shows a case where the MM I/O starting address 1232 is set to "A" and the address range 1233 is set to "R".

In this case, the starting address of the physical MM I/O address 1113 is set to "A", so a virtual MM I/O address 1104-B allocated to a guest 1 is set to (A+R) which is an address obtained by adding R to the starting address A. In addition, a virtual MM I/O address 1104-C allocated to a guest 2 is set to (A+2R) which is a value obtained by further adding R to the value (A+R).

Thus, the virtual MM I/O address is allocated to each address range, and the respective virtual MM I/O addresses used by the respective guests are mapped without being overlapped with each other. Therefore, the virtual MM I/O addresses are allocated to the respective guests such that the virtual MM I/O address becomes a unique address for each guest.

Figure 17:
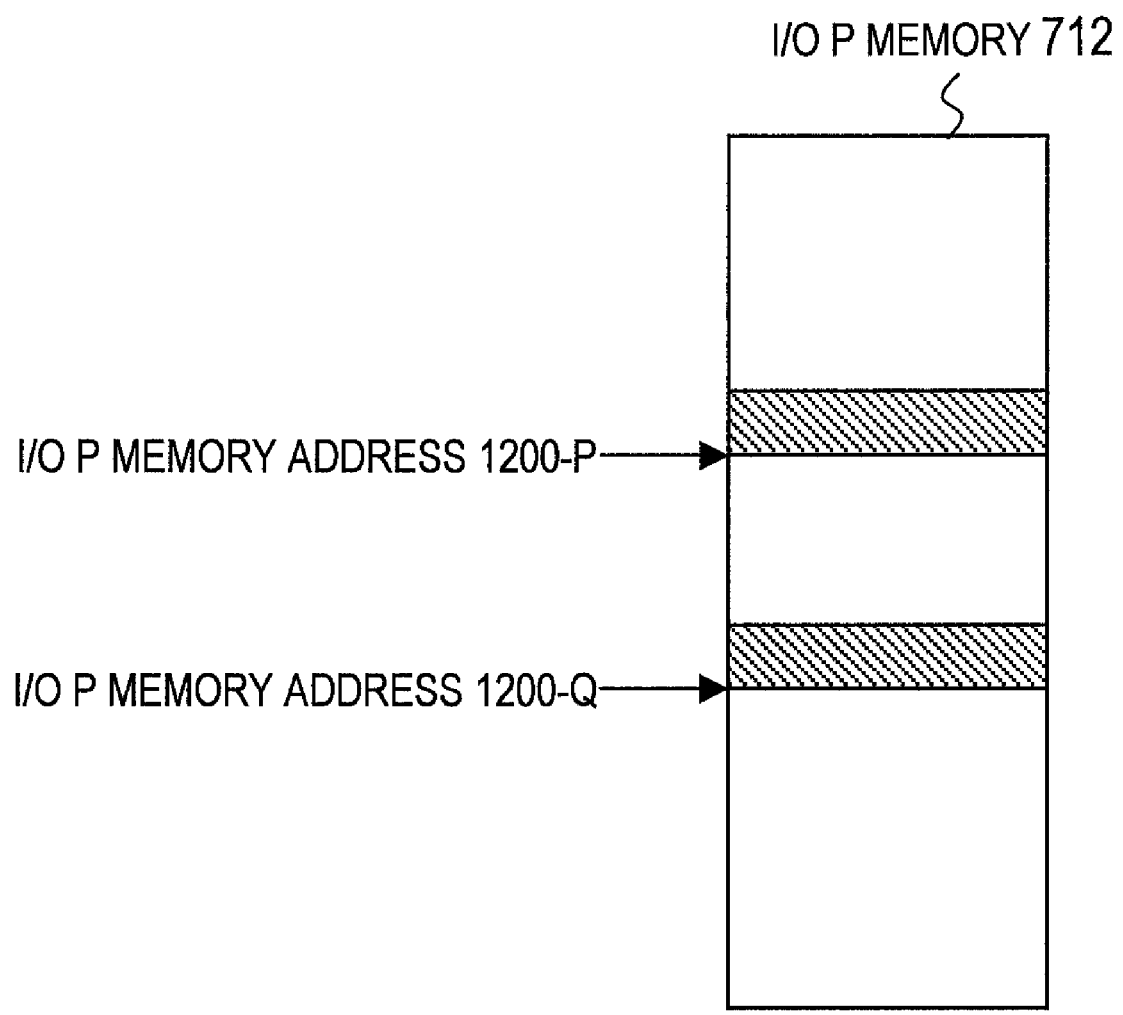
FIG. 17 is an explanatory diagram of an address map in an I/O P memory according to the first embodiment of this invention.

FIG. 17 is an explanatory diagram of an address map of the I/O P memory 712.

It should be noted that FIG. 17 shows a case where an I/O P memory address 1200-P is allocated to the guest 1 and an I/O P memory address 1200-Q is allocated to the guest 2.

These addresses are secured in the I/O P memory 712 such that the respective areas are not overlapped with each other. The I/O P memory 712 is used to temporarily hold the actual write in the MM I/O area.

Next, an operation at the time of the MM I/O write request from the guest.

Figure 18:
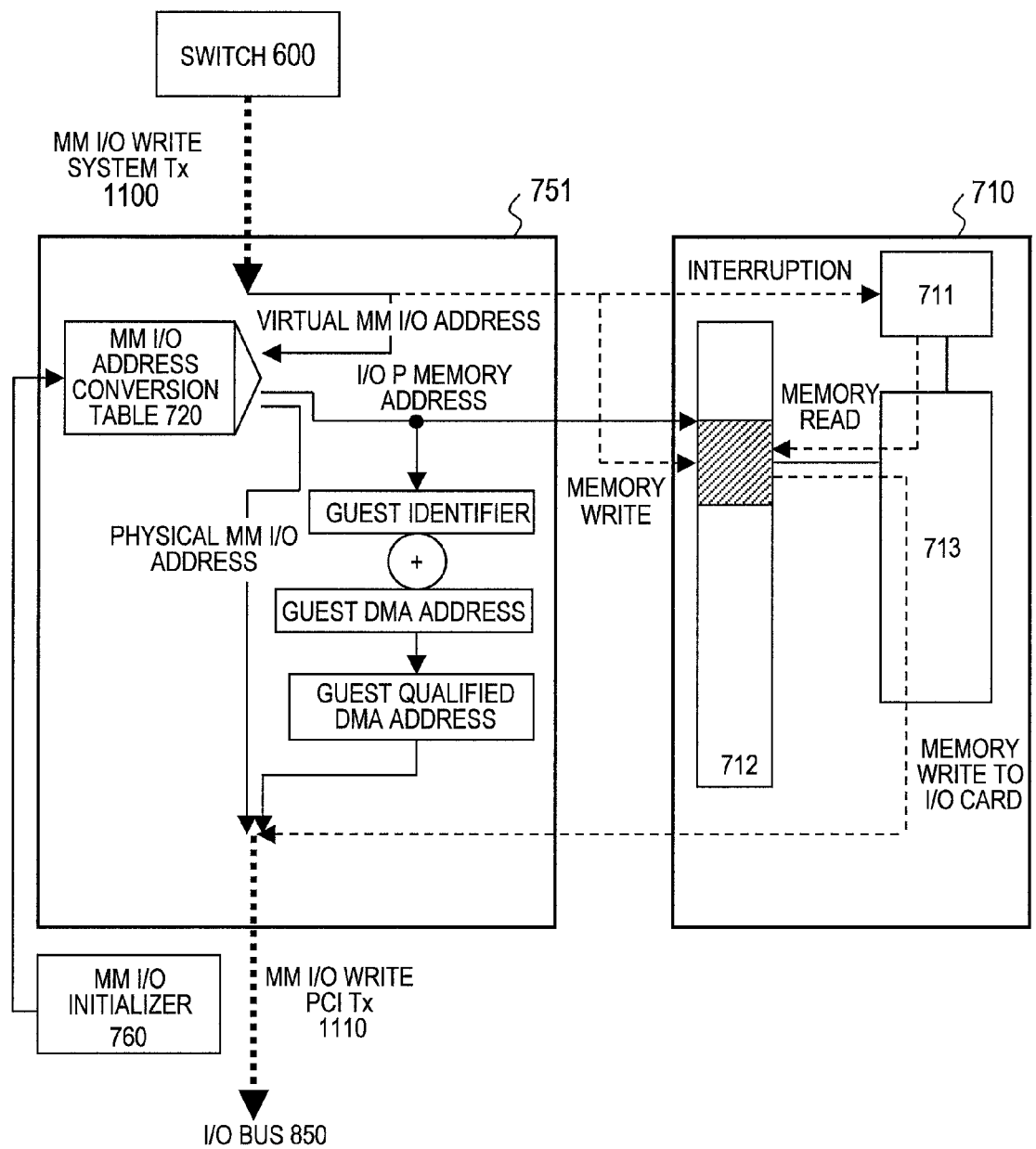
FIG. 18 is an explanatory diagram showing MM I/O write processing according to the first embodiment of this invention.

FIG. 18 is an explanatory diagram of the MM I/O write process.

It should be noted that FIG. 18 shows an operation in a case where, after the above-mentioned setting for initialization processing shown in FIGS. 13 to 15 is completed, an access request with respect to the I/O card 800 is made by the guest.

A control register of the I/O card 800 is mapped as the MM I/O area in the memory space. Thus, the access request with respect to the I/O card 800 made by the guest is executed as write in the MM I/O area.

Write in the MM I/O area is issued as the MM I/O write system Tx 1100 via the switch 600. The MM I/O write system Tx 1100 is trapped by the MM I/O write decoder 751 including the target I/O card 800.

Upon receiving the MM I/O write system Tx 1100, the MM I/O write decoder 751 refers to contents of the MM I/O system Tx 1100, and determines which register of the I/O card 800 to be accessed the access request from the guest is made for. In this case, the MM I/O write decoder 751 refers to the MM I/O address conversion table 720 to obtain the physical MM I/O address 1113, the guest identifier 1125, and the I/O P memory address 1200.

It should be noted that in a case where the access request from the host is made for a command register (CMD REG), the MM I/O write decoder 751 sends an interruption to the I/O P CPU 711 of the I/O processor 710. In a case where the access request is not a command register (CMD REG), the MM I/O write decoder 751 writes data in an area which is based on the I/O P memory address 100 receiving the MM I/O write system Tx 1100 in the I/O P memory 721.

The I/O P CPU 711 having received the interruption reads out an area starting from the corresponding I/O P address 1200, and copies the area in the physical MM I/O address 1113 on the physical I/O card 800. In this case, in order to copy the area associated with the address register, the MM I/O write decoder 751 buries the guest identifier 1125 in a significant unused address section 1116 of the guest DMA address 1115 to generate the guest qualified DMA address 1123. Further, the MM I/O write decoder 751 generates the MM I/O write PCI Tx 1110 including the generated guest qualified DMA address 1123, and issues the MM I/O write PCI Tx 1110 to the I/O bus 850.

By the above-mentioned operation, even when a plurality of guests access the same I/O card 800 at the same time, the actual access to the I/O card 800 is arbitrated by the I/O processor 710. In addition, since the guest identifier 1125 for identifying each guest is buried in the guest DMA address, even when the DMA request reaches from the I/O bus 850 afterward, it becomes possible to identify each requester guest.

Figure 19:
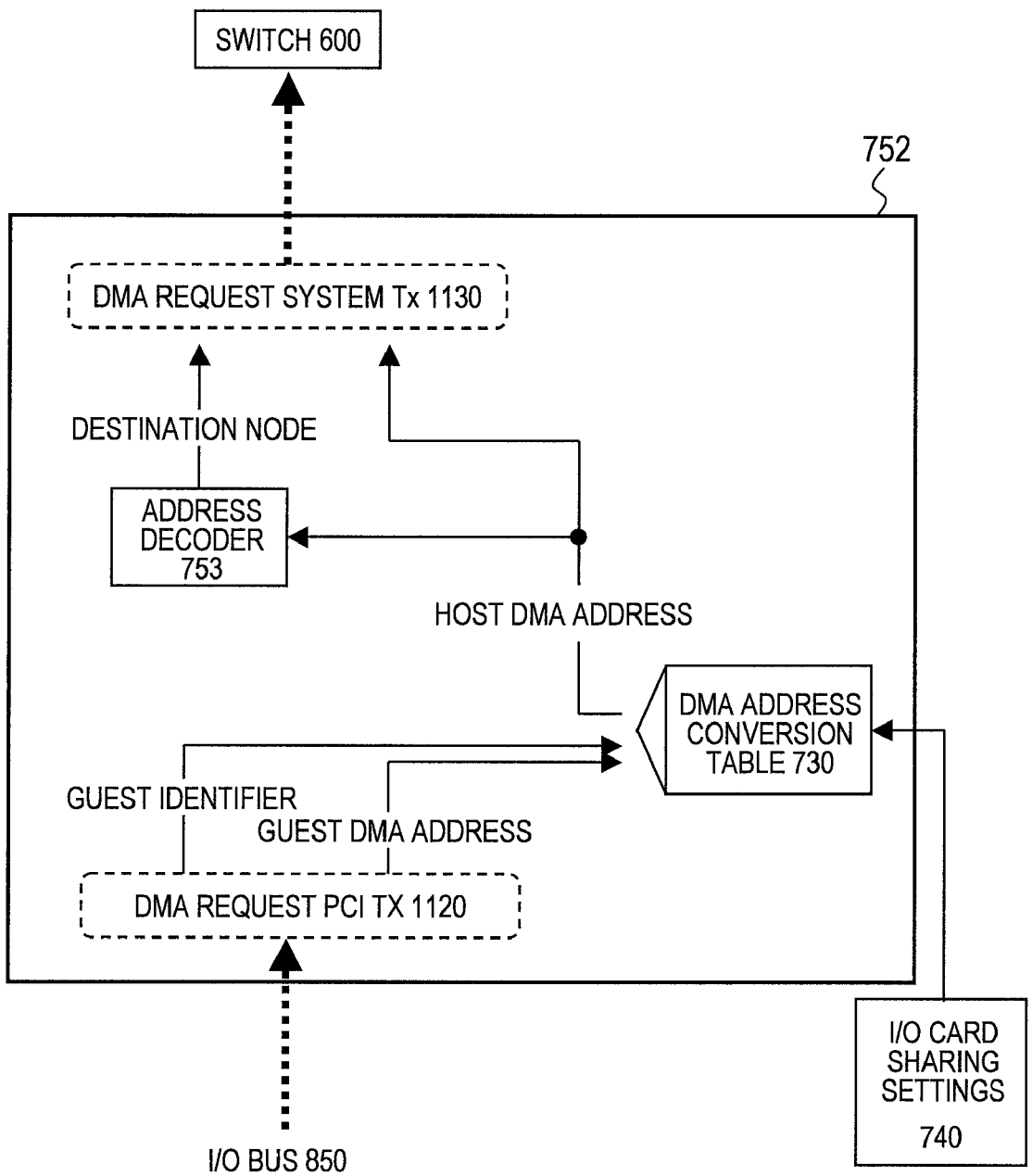
FIG. 19 is an explanatory diagram showing processing of a DMA request decoder according to the first embodiment of this invention.

FIG. 19 is an explanatory diagram of processing of the DMA request decoder 752.

The DMA request decoder 752 includes a DMA address conversion table 730 and an address decoder 753.

Upon receiving the DMA request PCI Tx 1120 from the I/O bus 850, the DMA request decoder 752 first extracts the guest DMA address 1115 and the guest identifier 1125 from the DMA request PCI Tx 1120.

Next, the DMA request decoder 752 refers to the DMA address conversion table 730 to obtain a pointer 731 pointing to a conversion table containing the guest DMA address 1115 and the host DMA address 1134 from the extracted guest identifier. Then, the DMA request decoder 752 refers to a table indicated by the pointer 731 obtained, to thereby obtain the host DMA address 1134 associated with the guest DMA address 1115.

Further, the DMA request decoder 752 decodes the converted host DMA address 1134 using the address decoder 753 to obtain a destination node 1131.

The DMA request decoder 752 includes the obtained destination node 1131 and the host DMA address 1134 into the DMA request system Tx 1130, and issues the DMA request system Tx 1130 to the switch 600.

It should be noted that the pointer 731 of the DMA address conversion table 730 is NULL, the DMA request decoder 752 provides the guest DMA address 1115 as the host DMA address 1134 without decoding.

By the above-mentioned series of operations, in the case where the I/O card is shared by a plurality of guests, the guest of the source of the access is identified, the identified guest identifier is buried in the guest DMA address, and the guest identifier is extracted from the DMA request, thereby making it possible to appropriately convert the guest DMA address into the host DMA address, and execute the DMA transfer in which the host DMA address is directly transferred to the memory space of the guest.

Figure 20:
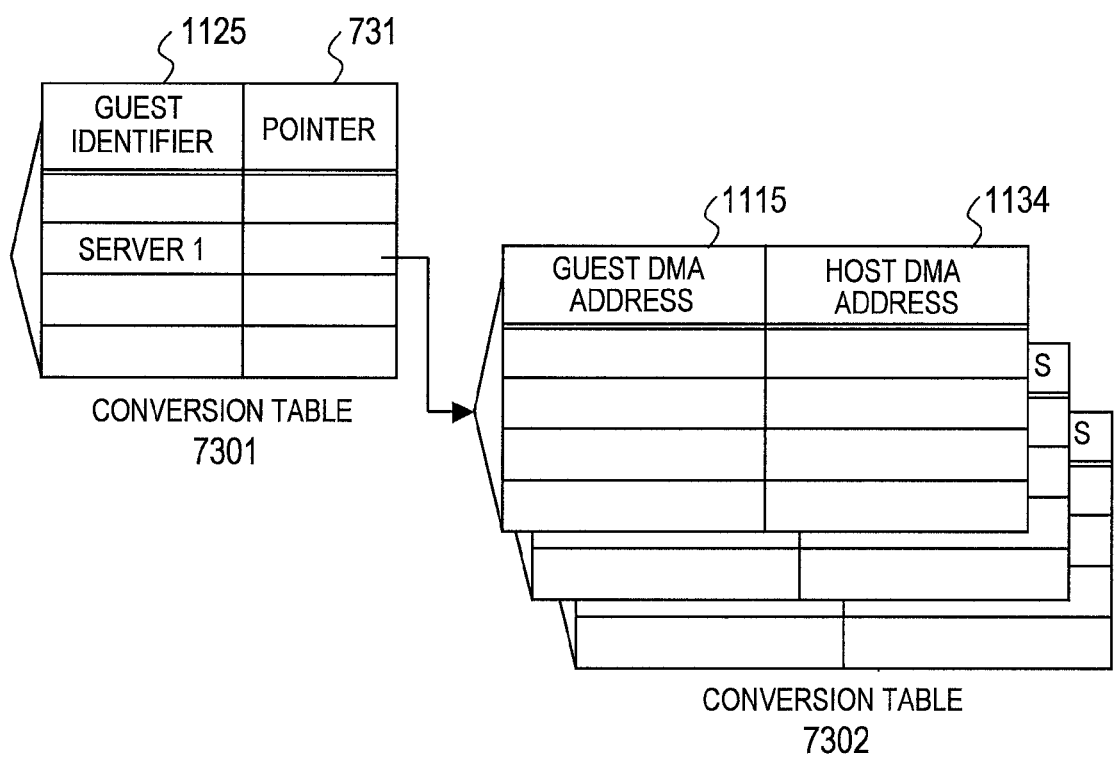
FIG. 20 is an explanatory diagram of an example of a DMA address conversion table according to the first embodiment of this invention.

FIG. 20 is an explanatory diagram of an example of the DMA address conversion table 730.

As shown in FIG. 20, the DMA address conversion table 730 is constituted of two tables which includes a table 7301 containing the guest identifier 1125 and the pointer 731, and a table 7302 containing the guest DMA address 1115 and the host DMA address 1134.

The pointer 731 includes pointers indicating the guest DMA address 1115 and the host DMA address 1134 which correspond to the guest identifier in the table 7302.

It should be noted that the DMA address conversion table 730 is generated by the hypervisor 500C by the use of the I/O card sharing settings 740. It should be noted that in a case where the hypervisor 500C is not provided and the guest is directly run on the physical server 300, it is unnecessary to convert the DMA address, so the pointer 731 in association with the guest is set to NULL.

As described above, in the computer system according to the first embodiment of this invention, the virtual MM I/O address associated with the physical MM I/O address for each I/O card is allocated to each guest, thereby making it possible to share an I/O card among a plurality of physical servers and logical servers. As a result, it is possible to remove the limitation in the number of servers in the server integration which is limited by the number of I/O card that can be mounted, and achieve more flexible server configuration and effective use of a hardware resource.

In particular, the I/O hub mutually converts the physical MM I/O address, the virtual MM I/O address, and the guest identifier, so the I/O hub enables the DMA transfer from the I/O card while achieving the sharing of the I/O card. As a result, in a case where the I/O card 800 is shared among the physical servers and the logical servers, it is possible to suppress performance degradation.

Further, in a case of the I/O card connected via the I/O bridge, the requester guest can be identified and the DMA transfer can be executed.

FIRST MODIFIED EXAMPLE

Next, a first modified example according to the first embodiment will be described.

As described above, according to the first embodiment, the MM I/O write decoder 751 directly traps a write in the command register of the MM I/O area of the I/O card 800 and in the address register. However, in recent years, along with an increase in the speed of the I/O card, a command chain capable activating a plurality of commands by a single MM I/O access has been employed in order to reduce the number of accesses to the MM I/O area which require more time as compared with a main storage access.

In the first modified example, operations of the MM I/O write decoder 751 and the I/O processor 710 when the I/O card 800 uses a command chain.

Figure 21:
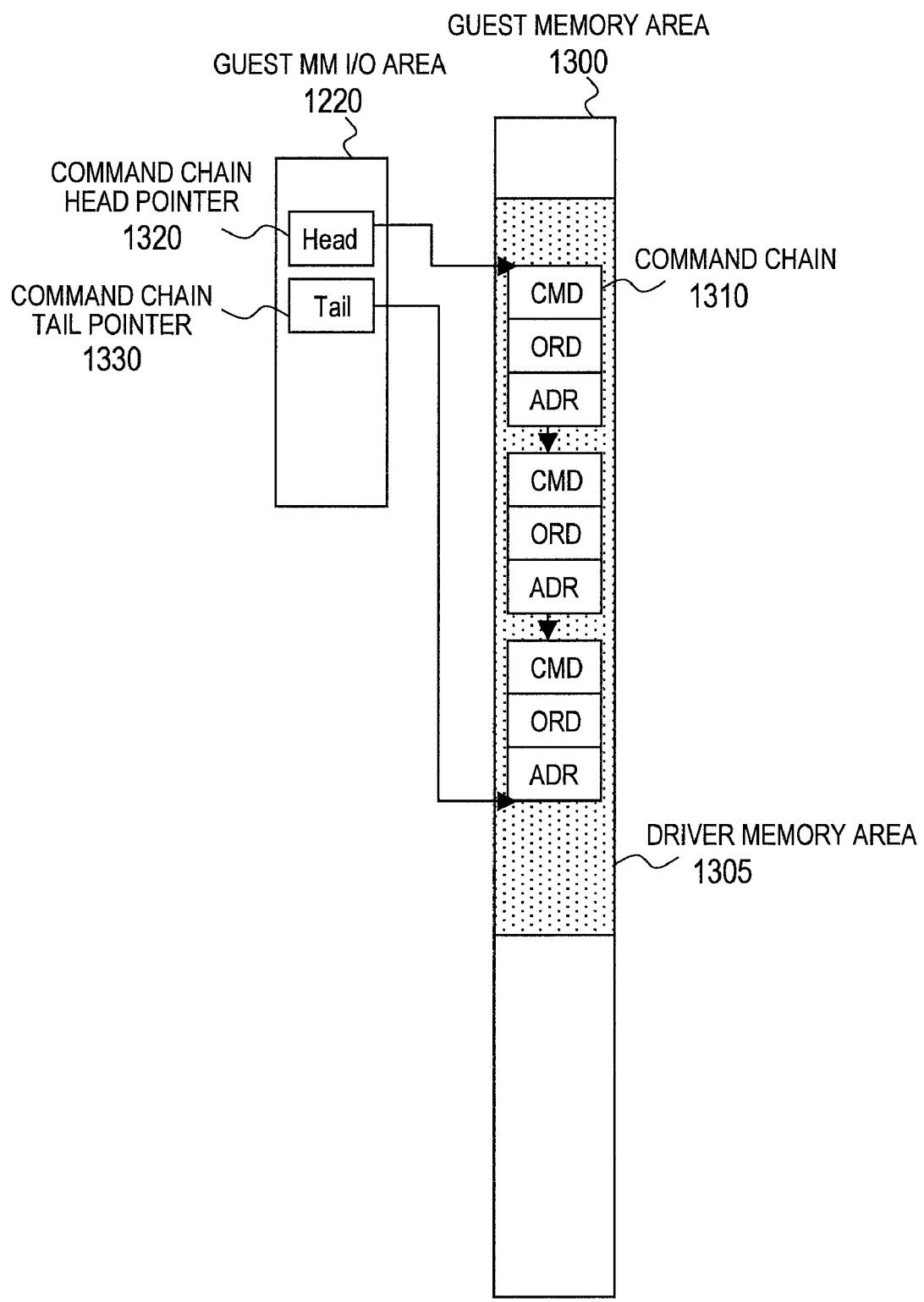
FIG. 21 is an explanatory diagram showing a guest MM I/O area and a guest memory area in a command chain according to a modified example of the first embodiment of this invention.

FIG. 21 shows an explanatory diagram of a guest MM I/O area 1220 and a guest memory area 1300 in the command chain.

In the command chain, a part of a driver memory area 1305 in the guest memory area 1300 includes a memory area for a command chain 1310. A command from a guest with respect to the I/O card 800 is written in a memory for the command chain 1310.

An access request from the host to the I/O card 800 is temporarily stored in the command chain 1310 of the guest memory 1300. Then, the real access request to the I/O card 800 is started with write in a command chain tail pointer 1330 of the MM I/O area. The I/O card 800 transfers the command chain 1310 stored between an address pointed by the command chain head pointer 1320 and an address pointed by the command chain tail pointer 1330 to a register on the I/O card 800. As a result, commands instructed by the command chain are collectively executed.

When trapping write in the command chain tail pointer 1330, the MM I/O write decoder 751 issues an interruption to the I/O P CPU 711 of the I/O processor. The I/O P CPU 711 having received the interruption copies the command chain 1310 in the I/O P memory 712. At this time, the guest identifier 1125 is buried in the register associated with the DMA address so as to identify each guest when the DMA request is made. Upon completion of the copying from the guest memory area 1300 to the I/O P memory 712, the I/O P CPU 711 writes an end address of the command chain in the I/O P memory 712 with respect to the command chain tail pointer in the real physical MM I/O. Thus, the command of the I/O card 800 is started.

As described above, the computer system according to the first modified example of the first embodiment of this invention may be applied to the I/O card 800 using the command chain.

SECOND MODIFIED EXAMPLE

Next, a second modified example according to the first embodiment will be described.

In the first embodiment, the I/O processor 710 is composed of an independent processor (i.e., I/O P CPU 711) and a memory (i.e., I/O P memory 712). In the second modified example, a part of each of the resource of the CPU 100 and the memory 120A with the processor and the memory included in a node is used. To be more specific, a part of the resource of the server may be allocated to the I/O processor as being dedicated only for the I/O processing, or the CPU 100 may be time-shared to be allocated to the I/O processing using the hypervisor 500C. It should be noted that a mode of using a part of the resource logically partitioned for the I/O processing is called I/O partition.

The MM I/O write decoder 751 includes, instead of a direct routing to the I/O processor 710, a register for setting an ID of the CPU which issues a base address of the memory for the I/O processing, a node ID, and an interruption.

In the case where the above-mentioned issuance of the interruption to the I/O P CPU 711 by the I/O processor, and write in the I/O P memory 712 are required, the MM I/O write decoder 751 generates the system Tx according to the values of the register, and transfers the system Tx to the node, which executes the I/O processing, via the switch 600.

Second Embodiment

Next, a second embodiment of this invention will be described.

A computer system according to the second embodiment includes a node controller 1000 having a function of both the above-mentioned I/O hub 700 and switch 600 of the first embodiment.

Figure 22:
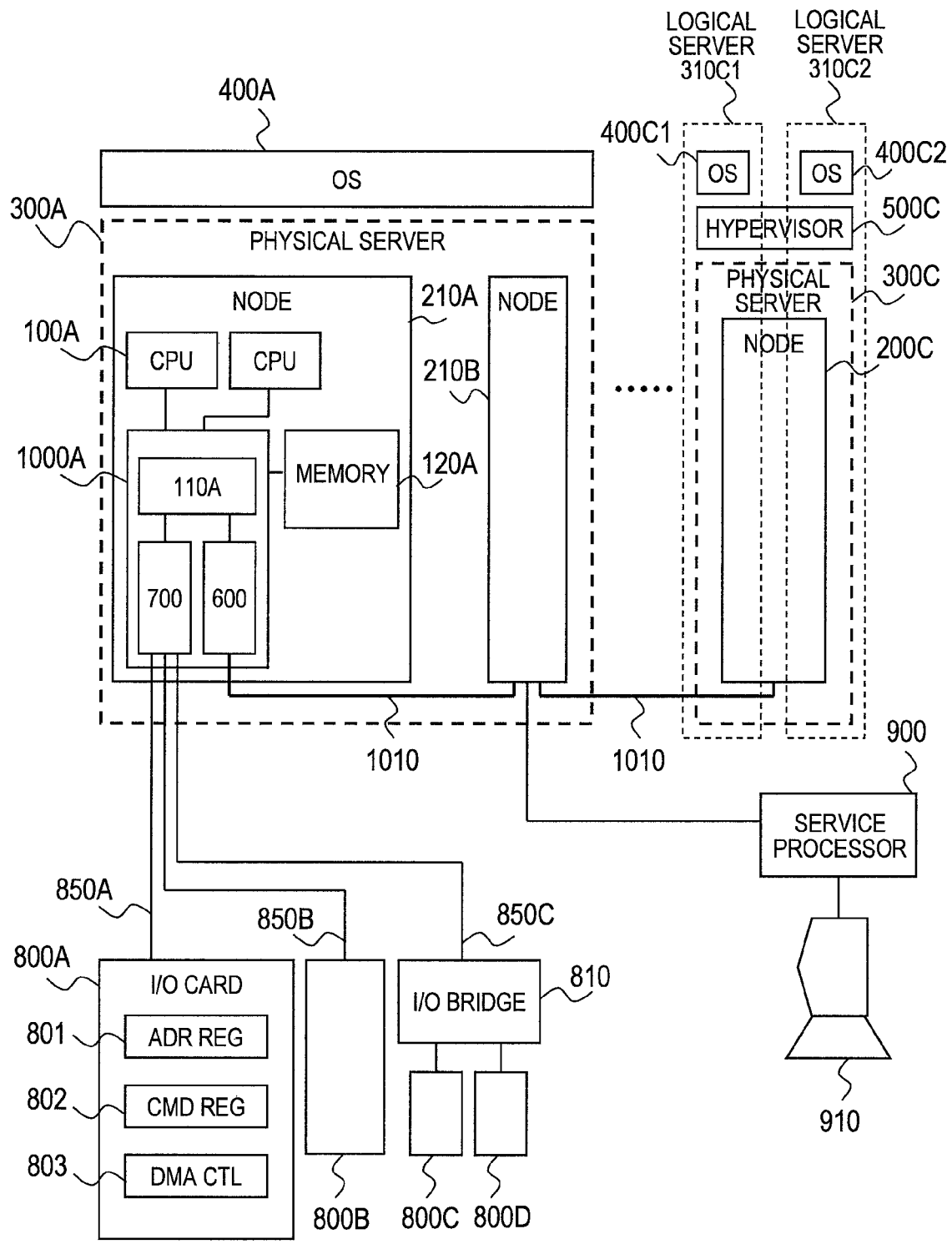
FIG. 22 is a configuration block diagram of a computer system according to a second embodiment of this invention.

FIG. 22 is a configuration block diagram of the computer system according to the second embodiment.

It should be noted that components identical with those according to the first embodiment are denoted by the identical reference symbols and explanations thereof are omitted.

The node controller 1000 (node controller 1000A) includes a switch 600, an I/O hub 700, and a north bridge 110A which are consolidated as a functional module.

The node controller 1000 is provided to a node 210A.

Similarly to the above-mentioned first embodiment, an I/O hub 700 is connected to an I/O card 800 and an I/O bridge 810 via an I/O bus 850. As described above, the I/O hub 700 includes the I/O card sharing module 750 and shares the I/O card 800. On the other hand, a switch 600 of one node 210 is connected to another switch 600 of another node 210 via a node link 1010 to transfer a transaction to an arbitrary node in the entire computer system. The processing is executed in the same manner as in the above-mentioned first embodiment.

It should be noted that in the second embodiment, it is more preferable to use a part of each of the CPU 100 and the memory 120A included in the node 210 for the I/O processing as in the first embodiment and the second modified example, rather than to include the I/O processor 710 in the I/O hub 700. In this case, the CPU 100 and the memory 120A to be used may be provided in a node 210A which is identical with the I/O hub 700 or may be provided in a node 210A which is different from the I/O hub 700.

Third Embodiment

Figure 23:
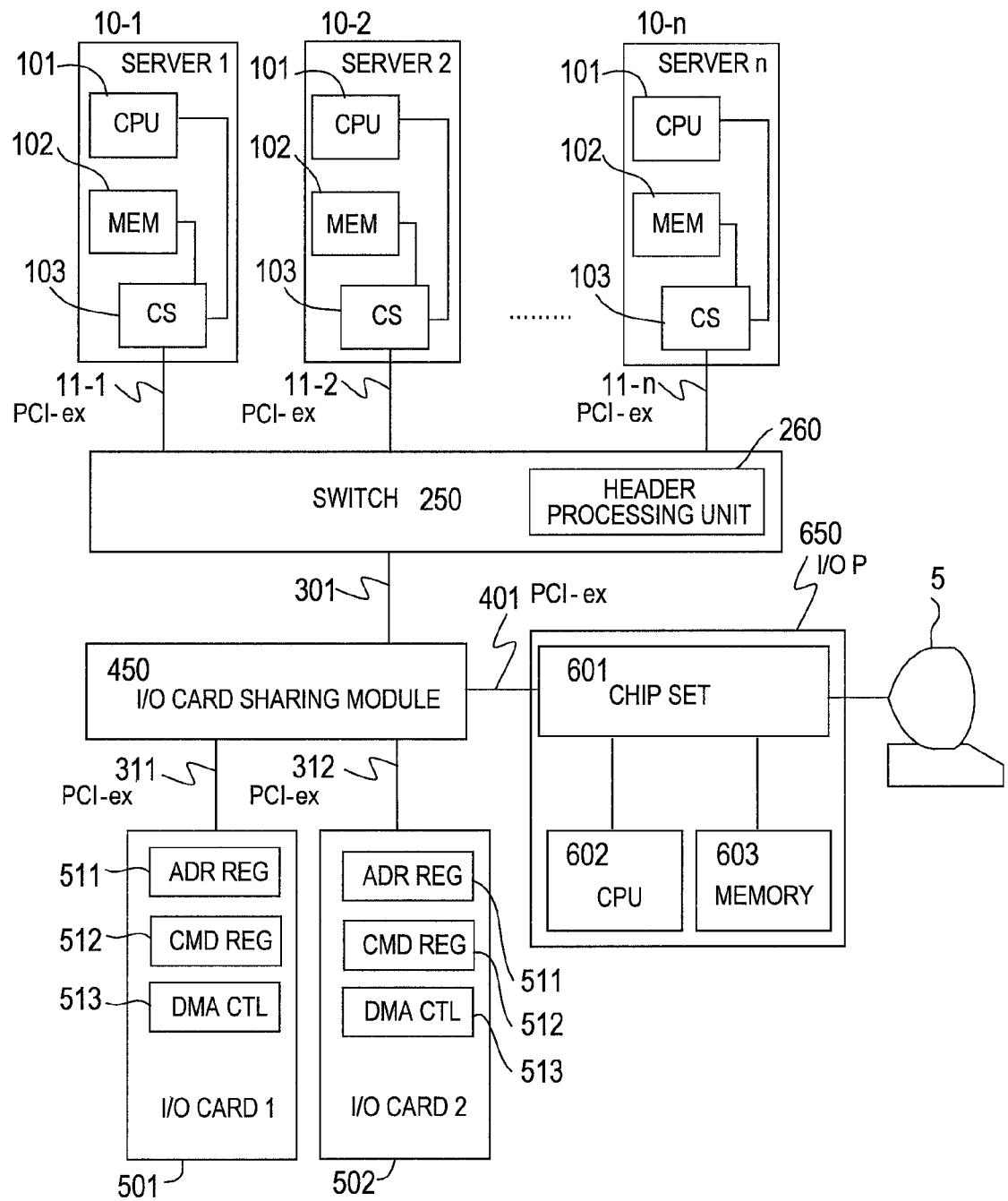
FIG. 23 is a block diagram of a blade server system according to a third embodiment of this invention.

FIG. 23 is a block diagram showing a blade server system according to a third embodiment.

The blade server system includes: a plurality of server blades 10-1 to 10-*n*; I/O cards 501 and 502 provided with I/O interfaces of various types; a switch 250 for connecting the server blades 10-1 to 10-*n* to the I/O cards; an I/O card sharing module 450 for sharing the I/O cards 501 and 502 among the plurality of the server blades 10-1 to 10-*n*; and an I/O processor blade 650 for managing the sharing of the I/O cards. The server blades, the switch 250, and the I/O card sharing module 450 are stored in a casing (not shown).

The server blades 10-1 to 10-*n* each include a CPU 101 and a memory 102 which are connected together through a chip set (or an I/O bridge) 103. The chip set 103 is connected to the switch 250 through one of general buses 11-1 to 11-*n*. In this embodiment, PCI-EXPRESS (referred to as PCI-ex in the drawing) is adopted for the general buses 11-1 to 11-*n*, for example.

The CPU 101 provides servers #1 to #n by executing an OS or an application loaded on the memory 102. The CPU 101 obtains access to the I/O cards 501 and 502 from the chip set 103 through the switch 250 and the I/O card sharing module 450.

The switch 250 includes a header processing unit 260 for adding header information to packets sent and received between the server blades 10-1 to 10-*n* and the I/O cards 501 and 502 and for transferring the packets based on the header information.

The header processing unit 260 adds header information to a packet (access request signal) sent from one of the server blades 10-1 to 10-*n* to one of the I/O cards 501 and 502, and transfers the packet to a node (I/O card) associated with the address included in the header information. The header information defines address information (identifier) of each of the server blades 10-1 to 10-*n* as a requester, and address information of each of the I/O cards as a destination. The header processing unit 260 of the switch 250 transfers a packet (response signal), which has been sent from one of the I/O cards to one of the server blades 10-1 to 10-*n*, to one of the server blades 10-1 to 10-*n* associated with the address (server identifier) included in the packet. Here, the packet transfer according to this embodiment is based on a PCI transaction (PCI-Tx), because PCI-EXPRESS is adopted as a general bus.

The I/O card sharing module 450 is connected between the switch 250 and the I/O cards 501 and 502, for sharing the I/O cards 501 and 502 among the plurality of server blades 10-1 to 10-*n* through the general buses 301, 311, and 312. The I/O card sharing module 450 is connected to the I/O processor blade 650 through a general bus 401. The I/O card sharing module 450 manages an address conversion and a sharing state relating to the sharing of the I/O cards, as described later. The I/O processor blade 650 has a console 5 connected thereto, through which an administrator or the like sets the sharing state of the I/O cards 501 and 502.

The I/O cards 501 and 502 each are provided with an interface such as a SCSI (or a SAS), a fibre channel (FC), or Ethernet (registered mark). The I/O cards 501 and 502 each are further provided with a direct memory access (DMA) controller 513 for directly accessing each of the memories 102 in the server blades 10-1 to 10-*n*. The I/O cards 501 and 502 each are further provided with a base address register 511 for designating a base address of memory mapped I/O (MM I/O) of the memory 102 on any one of the server blades 10-1 to 10-*n* making DMA through the DMA controller 513, and with a command register 512 for designating an instruction to be given to the I/O cards 501 and 502. The DMA controller 513 executes operation that corresponds to the command written by the command register 512 with respect to the memory 102 whose address is written by the base address register 511. The I/O cards 501 and 502 each include a register (not shown) (such as a configuration register or a latency timer register) conforming to the PCI standard.

Explained next is the I/O processor blade 650 including a CPU 602 and a memory 603 which are connected together through a chip set (or an I/O bridge) 601. The chip set 601 is connected to the I/O card sharing module 450 through the general bus 401. A predetermined control program is executed on the I/O processor blade 650 as described later, which executes processing such as an address conversion in response to an I/O access from any one of the server blades 10-1 to 10-*n*.

(I/O Card Sharing Module)

Next, a detailed explanation is given in the following of the I/O card sharing module 450 according to this invention, with reference to the block diagram of FIG. 24.

The I/O card sharing module 450, which is provided between the server blades 10-1 to 10-n and the I/O cards 501 and 502, performs an address conversion on an I/O access packet from any one of the server blades 10-1 to 10-n, to thereby make it possible to share a single I/O card with the plurality of server blades 10-1 to 10-n. Here, the switch 250, the general buses, and the I/O cards 501 and 502 each conform to PCI-EXPRESS. Hereinafter, the I/O access packet is referred to as PCI transaction.

The I/O card sharing module 450 mainly has three functions as follows:

1) a function of writing PCI transaction, which is sent from the server blades 10-1 to 10-n to the I/O cards 501 and 502, into the memory 603 of the I/O processor blade 650;

2) a function of issuing an interrupt request for the CPU 602 of the I/O processor blade 650, based on a write request for the command registers 512 of the I/O cards 501 and 502; and 3) a function of converting an address of the PCI transaction based on DMA from the I/O cards 501 and 502 to the server blades 10-1 to 10-n.

Figure 24:
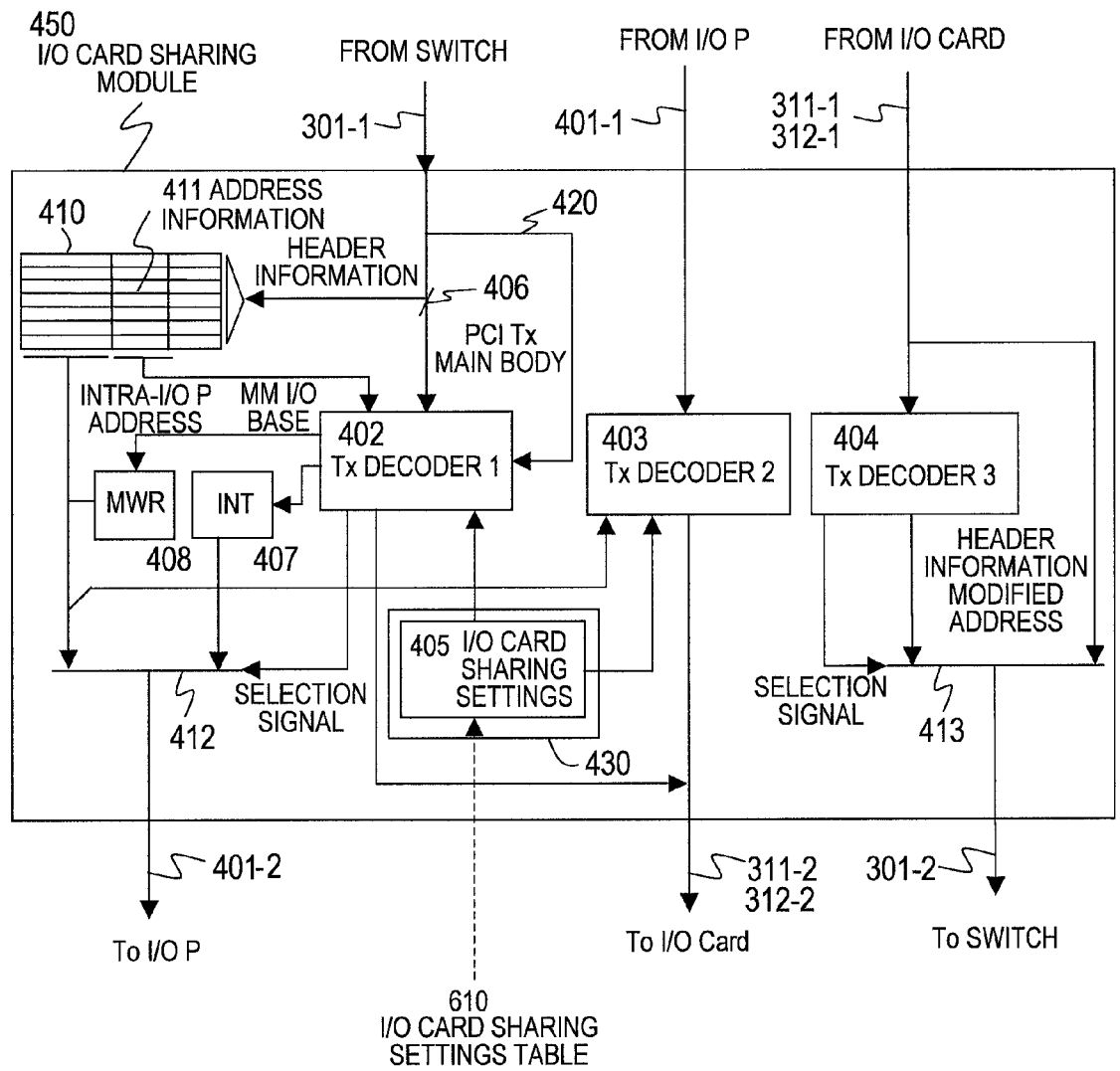
FIG. 24 is a block diagram of an I/O sharing module according to the third embodiment of this invention.

In FIG. 24, the I/O card sharing module 450 is composed almost exclusively of: a content addressable memory 410 for storing an address information table 411 described later; a header information extracting unit 406 for separating header information from the PCI transaction sent from any one of the server blades 10-1 to 10-n; a first transaction decoder 402 (referred to as Tx decoder 1 in the drawing) for analyzing a main body of the PCI transaction excluding the header information and sending instruction to the I/O processor blade 650; a second transaction decoder 403 (referred to as Tx decoder 2 in the drawing) for analyzing a signal from the I/O processor blade 650 and sending instruction to the I/O cards 501 and 502; a third transaction decoder 404 (referred to as Tx decoder 3 in the drawing) for analyzing the PCI transaction from the I/O cards 501 and 502 and correcting (converting) the destination address if the transaction is based on the DMA transfer; an interruption generating unit 407 for issuing an interruption to the CPU 602 of the I/O processor blade 650 based on the instruction provided by the first transaction decoder 402; a memory writing unit 408 for performing writing to the memory 603 of the I/O processor blade 650 based on the instruction provided by the first transaction decoder 402; a signal selecting unit 412 for selecting a signal to be outputted to the I/O processor blade 650, based on the instruction provided by the first transaction decoder 402; and a signal selecting unit 413 for selecting a signal to be outputted to the servers #1 to #n sides (switch 250) based on the instruction provided by the third transaction decoder 404.

Figure 25:
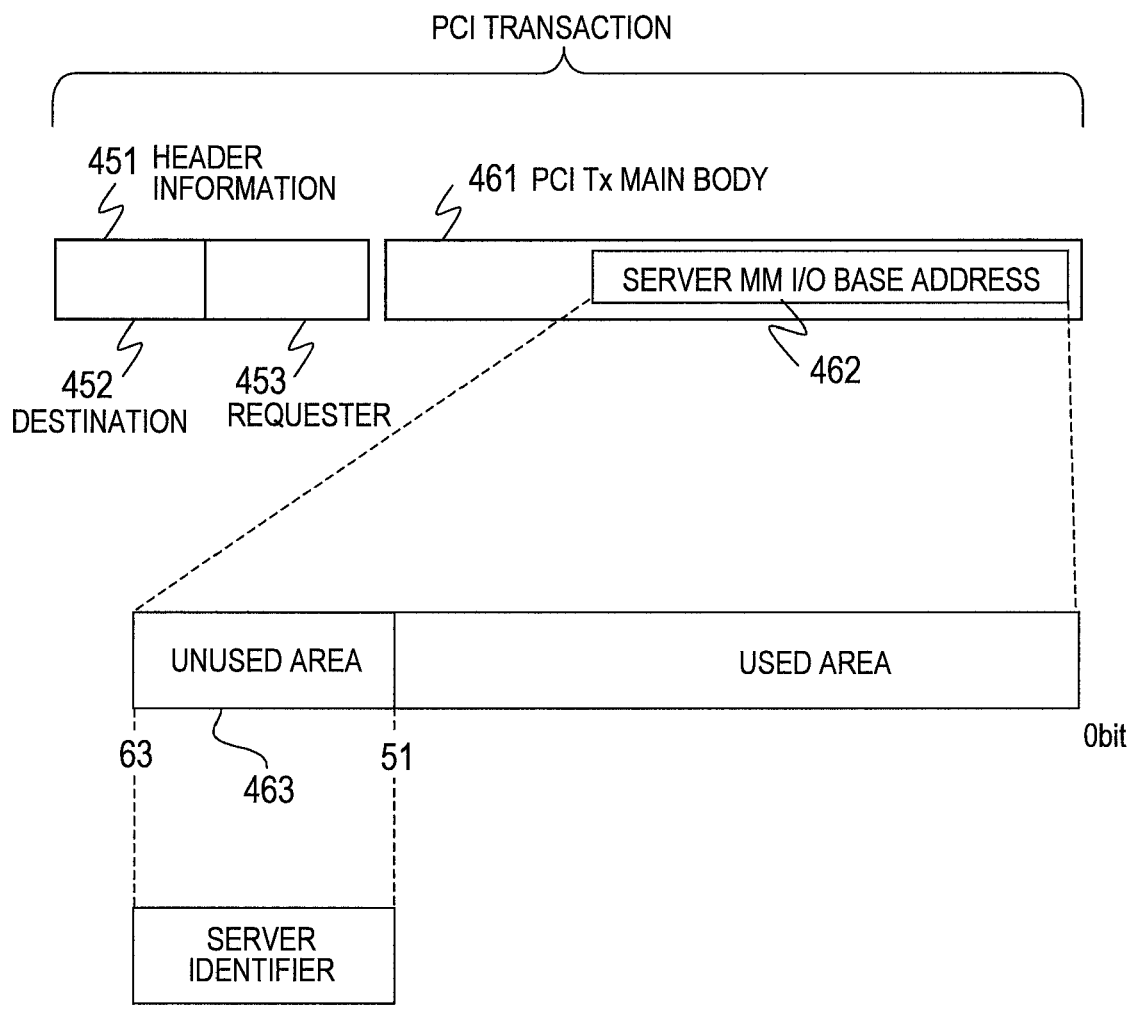
FIG. 25 is an explanatory diagram of a PCI transaction according to the third embodiment of this invention.

Here, the PCI transaction is constituted of, as shown in FIG. 25, a PCI transaction main body 461 storing data such as a command, an order, or a server address (MM I/O base address) 462 and header information 451 storing routing information. The header information 451 includes a destination 452 at the head thereof, which is followed by a requester 453 that has issued the PCI transaction. For example, as regards the PCI transaction from the server blades 10-1 to the I/O card 501, routing information (such as an address) to the I/O card 501 is defined as the destination 451, routing information of the server blade 10-1 is defined as the requester 453, and the PCI transaction main body 461 defines address information on the I/O register of the server blade 10-1, in addition to the command and the order, as the MM I/O base address 462.

In FIG. 24, reference numeral 301-1 denotes an outbound PCI transaction from the switch 250 to the I/O card sharing module 450 through the general bus 301 connecting the switch 250 (server blades 10-1 to 10-n side) and the I/O card sharing module 450. Reference numeral 301-2 denotes an inbound transaction from the I/O card sharing module 450 to the switch 250 (server blades 10-1 to 10-n side) through the general bus 301. Similarly, reference numeral 401-2 denotes an outbound instruction signal from the I/O card sharing module 450 to the I/O processor blade 650 through the general bus 401 connecting the I/O card sharing module 450 and the I/O processor blade 650, and reference numeral 401-1 denotes an inbound instruction signal (or the PCI transaction) from the I/O processor blade 650 to the I/O card sharing module 450 through the general bus 401. Further, reference numerals 311-1 and 312-1 each denote inbound PCI transactions from each of the I/O cards 501 and 502 to the I/O card sharing module 450 through one of the general buses 311 and 312 each connecting the I/O card sharing module 450 and the I/O cards 501 and 502, respectively. Also, reference numerals 311-2 and 312-2 each denote outbound PCI transactions from the I/O card sharing module 450 to each of the I/O cards 501 and 502 through one of the general buses 311 and 312, respectively.

In the I/O card sharing module 450, upon receiving the outbound PCI transaction 301-1 from the switch 250 (server side), the header information extracting unit 406 separates the PCI transaction into the header information 451 and the PCI transaction main body 461 as shown in FIG. 25. The header information extracting unit 406 further extracts an offset from the MM I/O base address defined in the PCI transaction. The header information extracting unit 406 then inputs the header information 451 and the offset into the contact addressable memory 410, and also inputs the PCI transaction main body 461 to the first transaction decoder 402.

The content addressable memory 410 includes a CAM (contents addressable memory), and holds the address information table 411 defined by the I/O processor blade 650. The address information table 411 stores access permission information (allocation information) on each of the servers #1 to #n with respect to the I/O cards 501 and 502 connected to the I/O card sharing module 450, as described later.

Then, the content addressable memory 410 inputs an address to be found (header information 451) as a search key (bit string), and outputs an address associated with the search key thus inputted from a preset table (address information table 411). As described later, the content addressable memory 410 refers to the header information 451 inputted, and outputs the base address of MM I/O and an address of the memory 603 on the I/O processor blade 650 both associated with the header information 451.

The first transaction decoder 402 refers to the PCI transaction main body 461 received from the header information extracting unit 406 and the MM I/O base address received from the content addressable memory 410 so as to analyze an instruction of the PCI transaction main body 461, to thereby select an outbound instruction signal 401-2 to be outputted to the I/O processor blade 650. When the instruction of the PCI transaction main body 461 is not a predetermined instruction, the transaction decoder 402 transfers the PCI transaction received by the I/O card sharing module 450 to one of the I/O cards 501 and 502 as the outbound PCI transaction without making any modification thereto.

Explained next is a memory space in a case where the plurality of server blades 10-1 to 10-n (servers #1 to #n) share a single I/O card. In the following embodiment, three servers #1 to #3 share a single I/O card 501.

Figure 26:
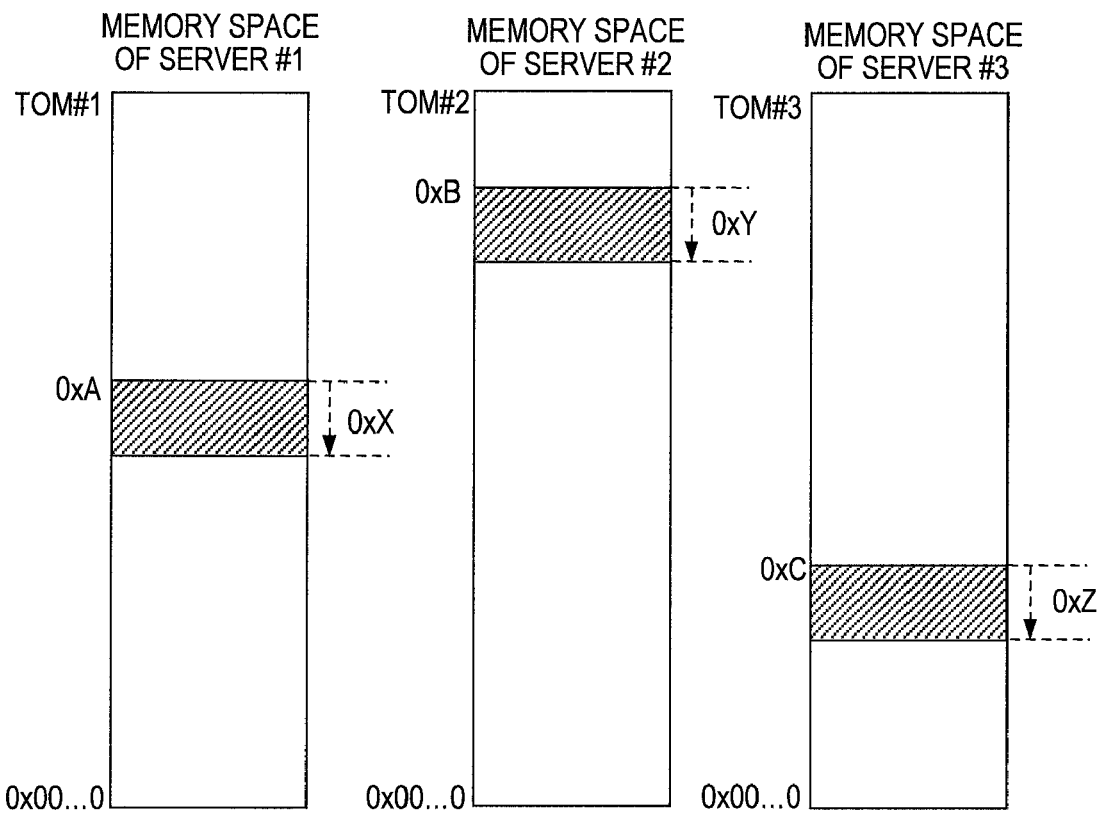
FIG. 26 is an explanatory diagram of a memory space in a server according to the third embodiment of this invention.

The servers #1 to #3 each set an I/O area to the memory 102 of each of the servers for one I/O card, and the I/O area is associated with the MM I/O address space. For example, as shown in FIG. 26, for each I/O card to be used (or shared) (in this case, the I/O card 501), the servers #1 to #3 (server blades 10-1 to 3) each have the MM I/O area with MM I/O base address of 0xA, 0xB, or 0xC and an offset, which indicates a size of the memory space, of 0xS, 0xY, or 0xZ, respectively defined thereto. Those MM I/O base addresses and the offsets are determined by a BIOS or the OS activated in the server blades 10-1 to 10-n.

Figures 27, 28:
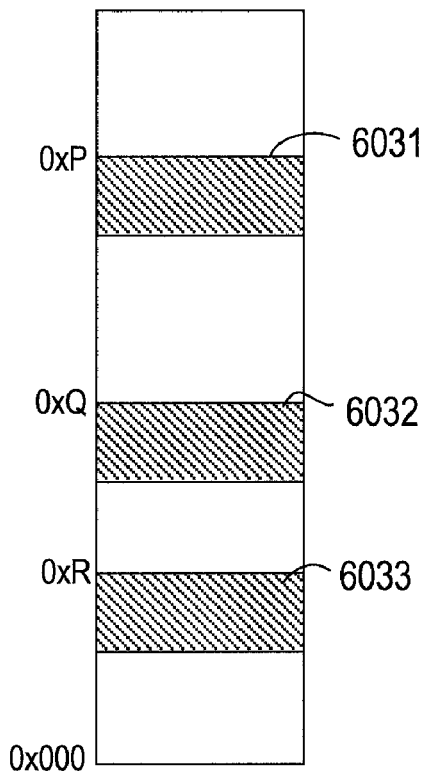
FIG. 27 is an explanatory diagram of a memory space in an I/O processor blade according to the third embodiment of this invention.
FIG. 28 is an explanatory diagram showing an example of an address information table according to the third embodiment of this invention.

In correspondence with the MM I/O of each of the servers #1 to #3, the memory 603 of the processor blade 650 includes the memory spaces 6031 to 6033 set thereto, as shown in FIG. 27, for the I/O card 501 which is to be shared by the servers #1 to #3, as described later. In FIG. 27, the memory space 6031 (0xP) is set to the memory 603 of the I/O processor blade 650 so as to be associated with the MM I/O base address 0xA of the server #1. It should be noted that the I/O processor blade 650 sets a memory space on the memory 603 only for the MM I/O of the server which shares the target I/O card for sharing, based on an I/O card sharing settings table 610 (see FIG. 29) set in the memory 603. Similarly, the memory space 6032 (0xQ) is set so as to be associated with the MM I/O base address 0xB of the server #2 which shares the I/O card 501, and the memory space 6033 (0xR) is set so as to be associated with the MM I/O base address 0xC of the server #3.

Then, the I/O areas associated with the MM I/O base addresses of the servers #1 to #3, that is, 0xA, 0xB, and 0xC, share the I/O card 501. Accordingly, the address information table 411 of the content addressable memory 410 is set as shown in FIG. 28 by the I/O processor blade 650.

The address information table 411 of FIG. 28 includes: a header 4111 which is to be compared with the header information 451 of the PCI transaction received by the I/O card sharing module 450 from any one of the servers #1 to #3; an MM I/O base address 4112 which is to be outputted when the header information 451 has matched the header 4111 in the address information table 411; and an address (referred to as IoP ADDR in the drawing) 4113 of the memory space in the I/O processor blade 650, which is outputted when the header information 451 has matched the header 4111 of the address information table 411; and an offset 4114 which is to be compared with the offset inputted to the content addressable memory 410. The header 4111, the MM I/O base address 4112, the address 4113, and the offset 4114 are preset.

As described above, in the case where the servers #1 to #3 share the I/O card 501, the address information of the servers #1 to #3 is set to the header 4111 of the address information table 411 of FIG. 28, while the MM I/O base addresses shown in FIG. 26 regarding the server #1 to #3 are set to the MM I/O base address 4112. In the memory space address 4113, there is set the address information of the memory spaces 6031 to 6033 so as to be associated with the MM I/O base address of the servers #1 to #3 as shown in FIG. 27. In the offset 4114, a difference from the MM I/O base address is set so as to obtain the sizes of the memory spaces of the servers #1 to #3.

In the header 4111, the destination 452 of the header information 451 is set in such a manner that the "Io1" indicating address information of the I/O card 501 forms a pair with each of "SV1" to "SV3" indicating address information of the servers #1 to #3 of the requester 453 which has requested the I/O access, and each pair is set as an address for comparison.

For example, the PCI transaction from the server #1 (server blade 10-1) to the I/O card 501 includes the destination 452 of the header information 451 having "Io1" set thereto, and the requester 453 having "SV1", which is the address information of the server #1, set thereto. The header information 451 extracted by the header information extracting unit 406 is inputted to the address information table 411 of the content addressable memory 410, so that the content addressable memory 410 outputs the MM I/O base address 0xA of the server #1 and the address=0xP of the memory space 6031 of the I/O processor blade 650 for sharing the I/O card 501 by the server #1.

The MM I/O base address outputted from the content addressable memory 410 is inputted to the first transaction decoder 402, and the address of the memory space 6031 is inputted to the signal selecting unit 412.

The following explanation is given on the operation of the transaction decoders 402 to 404 with the above-mentioned memory space.

The first transaction decoder 402 extracts an instruction regarding the I/O cards 501 and 502 from the PCI transaction main body 461 received from the header information extracting unit 406. Based on the contents of the instruction, the I/O card sharing module 450 makes a decision on what signal to output to the I/O processor blade 650 or to the I/O cards 501 and 502 as follows.

A) In the case where the instruction extracted from the PCI transaction main body 461 is a write instruction to the command register 512 of each of the I/O cards 501 and 502 (instruction to start the operation of the I/O card, for example, a DMA transfer starting command), the transaction decoder 402 provides instructions to the interruption generating unit 407 to output an interruption, and also to the signal selecting unit 412 to select the output from the interruption generating unit 407 to output an outbound instruction signal 401-2 of the general bus 401 to the I/O processor blade 650. This interruption signal includes the address 4113 of the I/O processor blade 650 outputted by the content addressable memory 410. In executing the interruption, the header information 451 and the offset each inputted to the content addressable memory 410 need to match the header 4111 and the offset 4114 of the address information table 4111, respectively.

B) In the case where the instruction extracted from the PCI transaction main body 461 is a write instruction to a register (for example, the base address register 511) other than the command register 512 of each of the I/O cards 501 and 502 (instruction not to start the operation of the I/O card, such as a DMA initialization request), the transaction decoder 402 provides instructions to the memory writing unit 408 to write the PCI transaction (including the header information 451 and the PCI transaction main body 461) to a predetermined memory space of the I/O processor blade 650, and also provides instructions to the signal selecting unit 412 to select the output from the memory writing unit 408 to output an outbound instruction signal 401-2 of the general bus 401 to the I/O processor blade 650. The memory writing unit 408 writes the header information 451 and the PCI transaction main body 461 with respect to the address 4113 of the I/O processor blade 650 outputted from the content addressable memory 410.

C) In the case where the instruction extracted from the PCI transaction main body 461 is an instruction other than a write request to the register of each of the I/O cards 501 and 502, the transaction decoder 402 outputs the PCI transaction, which has been received from a signal line 420, as an outbound PCI transactions 311-2 and 312-2 without making any modification thereto, through the general buses 311 and 312 connecting the I/O card sharing module 450 and the I/O cards 501 and 502. In this case, the transaction decoder 402 refers to the destination 452 of the header information 451 of the PCI transaction so as to select one of the general buses 311 and 312 each respectively connecting to the I/O cards 501 and 502, depending on which one of the I/O cards 501 and 502 is associated with the destination 452.

In either of the above cases of A) to C), the transaction decoder 402 refers to an I/O card sharing settings 405 described later, and prohibits access when the server of the requester does not have the destination I/O card allocated. Also, when the transaction decoder 402 refers to the I/O card sharing settings 405 described later to find that an allocation state (attribute) is in an "EXCLUSIVE" state indicating an exclusive use of the I/O card, the transaction decoder 402 transfers the PCI transaction as it is to the destination I/O card according to the function described in the above C), without performing address decoding by the content addressable memory 410, to thereby allow normal access to be made where the servers #1 to #n and the I/O cards 501 and 502 directly execute the I/O processing.

As described above, the transaction decoder 402 of the I/O card sharing module 450, which is provided between the servers #1 to #n and the I/O cards 501 and 502, converts the writing in the register of each of the I/O cards 501 and 502 into the operation for the I/O processor blade 650 (write processing or an interruption processing with respect to the memory space), thereby making it possible to share the I/O cards 501 and 502 each having no sharing function. For example, when the servers #1 to #n issue a DMA transfer request (DMA initialization request) to the I/O cards 501 and 502, the transaction decoder 402 writes MM I/O base address, to which the I/O card sharing module 450 performs the DMA transfer, in the memory space of the I/O processor blade 650, according to the function described in the above B). Next, when the servers #1 to #n provides instructions to start the DMA transfer, the transaction decoder 402 interrupts the I/O processor blade 650 according to the function described in the above A) and writes in the command register 512 and the base address register 511 of either of the I/O cards 501 and 502, which is caused to make DMA by the CPU 602 of the I/O processor blade 650 in place of the servers #1 to #n. Then, one of the I/O cards 501 and 502 performs a DMA transfer to the requester servers #1 to #n, following an instruction given by the I/O processor blade 650 which has issued an I/O access request in place of the servers #1 to #n. It should be noted that the detailed operation of the I/O processor blade 650 will be described later. Further, upon receiving a request from the server blades 10-1 to 10-n to refer a configuration register (not shown) of the I/O card for initialization at startup, the transaction decoder 402 interrupts the CPU 602 of the I/O processor blade 650, and writes the PCI transaction in the memory 603.

Described next is a main function of the second transaction decoder 403 of the I/O card sharing module 450. That is, the second transaction decoder 403 performs filtering such that an inbound instruction signal 401-1 received from the I/O processor blade 650 through the general bus 401 is outputted exclusively to the I/O card 501 or to the I/O card 502 which is shared.

Accordingly, the I/O card sharing module 450 includes a register 430 for storing the I/O card sharing settings 405 as an area for referring an I/O card sharing settings table 610 (see FIG. 29) provided on the memory 603 of the I/O processor blade 650.

Here, as shown in FIG. 29, the I/O card sharing settings table 610 includes attributes for indicating each server allocated (available) for each I/O card, which is set by the administrator through the console 5 or the like. The table is composed of an identifier 611 including address information (such as a device number) of an I/O card, a type 612 indicating a function of the I/O card, and allocation states 613 to 615 of the servers #1 to #3.

FIG. 29 shows a relationship between (attributes of) the servers #1 to #3 and the I/O cards 501 and 502, in which an I/O card 1 under the identifier 611 corresponds to the I/O card 501, and the type 612 indicates SCSI card with the attribute of "SHARED" indicating that the I/O card 1 is shared by the servers #1, #2, and #3. The number of the allocation states 613 to 615 changes in accordance with the number of the servers operating.

The I/O card 2 under the identifier 611 corresponds to the I/O card 502 of NIC card as indicated by the type 612. The attribute "EXCLUSIVE" indicates that the I/O card 2 is not shared by the other servers #1 and #3. The number of the allocation states 613 to 615 changes in accordance with the number of the servers operating. The access from the servers #1 and #3 to the I/O card 2 is prohibited because the I/O card 2 is not allocated (available) to the servers #1 and #3.

Upon receiving the PCI transaction from the I/O processor blade 650, the transaction decoder 403 extracts a server address (MM I/O base address) from the PCI transaction main body 461 to compare the address with the MM I/O base addresses 4112 in the address information table 411, and if the address match any one of the MM I/O base addresses, obtains the destination and the requester from the header 4111 of the entry of the MM I/O address. Next, the transaction decoder 403 compares the destination thus obtained with the identifier of the I/O card sharing settings 405, to thereby search for the server which is identical to the requester obtained from the matching entry. When the server thus searched for has the I/O card associated with the destination allocated thereto, which justifies the PCI transaction received by the transaction decoder 403, the transaction decoder 403 outputs the PCI transaction to the I/O card as the destination. On the other hand, when the corresponding server does not have the I/O card associated with the destination allocated thereto, which means that the I/O access request is unjustifiable, the transaction decoder 403 discards the PCI transaction. The I/O card sharing module 450 may also notify the server of the error after the PCI transaction is discarded.

Described next is a main function of the third transaction decoder 404 of the I/O card sharing module 450. That is, the third transaction decoder 404 converts the header information 451 and a server address of the PCI transaction main body 461 so as to return the outbound PCI transactions 311-1 and 312-1, which have been received from the I/O card 501 and 502 through the general bus 311 and 312, to the servers #1 to #n each being requester of the I/O access.

The transaction decoder 404 determines whether the PCI transactions 311-1 and 312-1, which have been received from the I/O card side, requires an address conversion (such as DMA) or not (for example, an event such as an interruption), and selects any one of the output of the transaction decoder 404 and the inbound transaction 311-1 and 312-1, by using the signal selecting unit 413.

When the PCI transactions 311-1 and 312-1 received from the I/O card side is a DMA transfer, the transaction decoder 404 determines that the address conversion is necessary and instructs the signal selecting unit 413 to select an output from the transaction decoder 404. On the other hand, when the PCI transactions do not require the address conversion, the transaction decoder instructs the signal selecting unit 413 to output the received PCI transactions 311-1 and 312-1 without making any modification thereto.

The transaction decoder 404 makes a determination as to whether the address conversion is necessary or not, depending on whether the PCI transaction main body 461 shown in FIG. 25 includes identifiers (address information, etc.) of the servers #1 to #n at predetermined significant bits set in an unused area of the MM I/O base address 462, as described later. Specifically, the transaction decoder 404 determines that the address conversion is necessary when the PCI transaction main body 461 includes identifiers of the servers #1 to #n (hereinafter, referred to as "server identifier") at the significant bits of the MM I/O base address 462. When the PCI transaction main body 461 includes no server identifier, the transaction decoder 404 determines that the address conversion is unnecessary.

(I/O Processor Blade)

Figure 30:
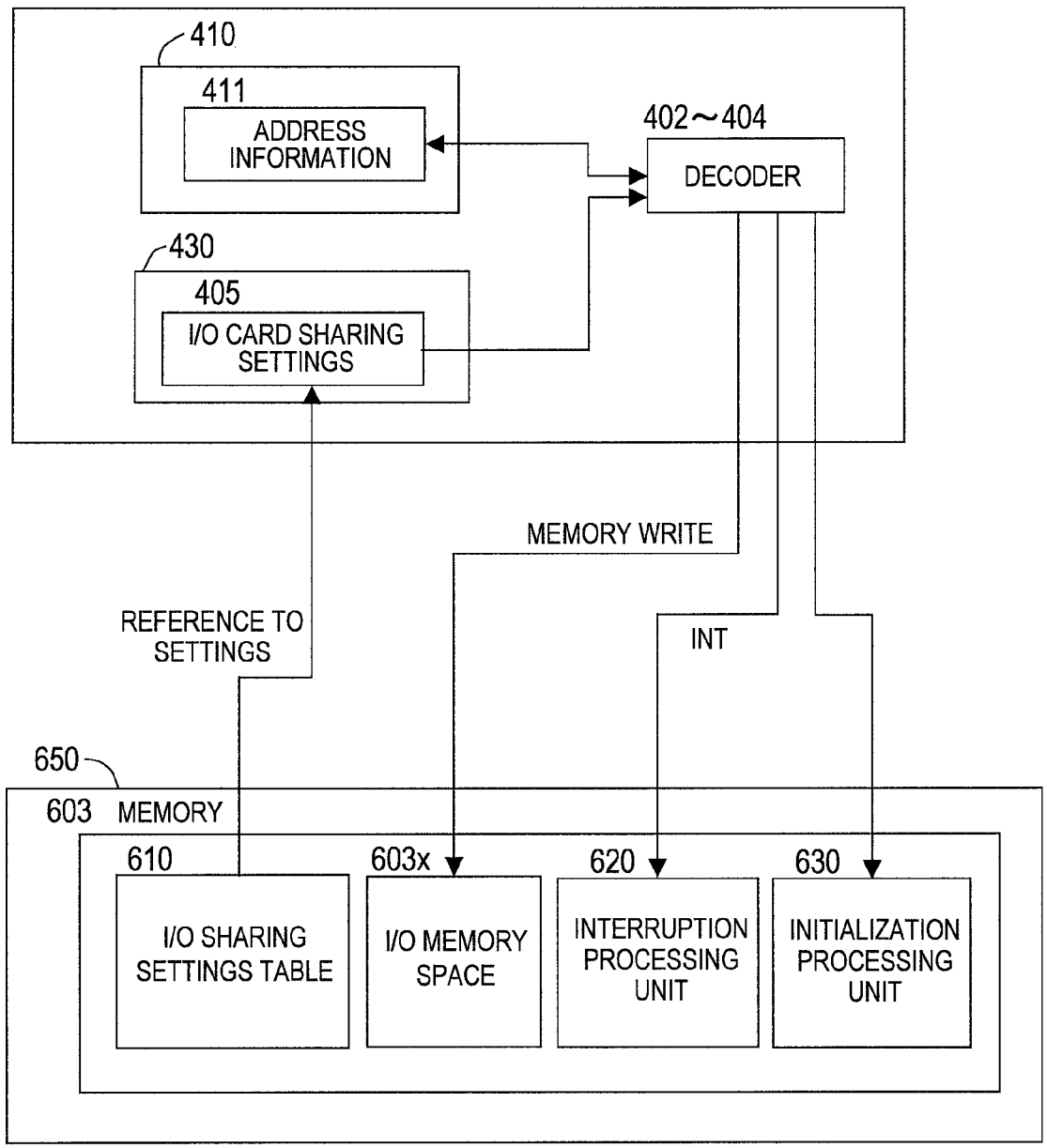
FIG. 30 is a block diagram of the relation between the I/O card sharing mechanism and the I/O processor blade according to the third embodiment of this invention.

Next, the function of the I/O processor blade 650 is explained in the following. FIG. 30 is a functional block diagram mainly showing the I/O processor blade 650.

In FIG. 30, the memory 603 of the I/O processor blade 650 stores the I/O card sharing settings table 610 of FIG. 29 and the memory spaces 6031 and 6032 (represented by 603x in the drawing) of the I/O cards shared by the plurality of servers. The memory 603 further includes an interruption processing unit 620 loaded by a ROM or the like (not shown), which is activated upon an interruption (denoted by INT in the drawing) from the I/O card sharing module 450. In activating the server blades 10-1 to 10-n, an initialization processing unit 630 is loaded onto the memory 603 by an ROM or the like (not shown) upon an interruption from the I/O card sharing module 450.

The I/O card sharing settings table 610 is appropriately set by the administrator or the like through the console 5 connected to the I/O processor blade 650, as described above, by which the allocation between the I/O cards and the servers #1 to #n is defined. The memory space 603x of the memory 603 is set by the CPU 602 upon activation of the servers #1 to #n as described later. When the PCI transaction received from the switch 250 corresponds to the above B), for example, when the PCI transaction includes a write command (DMA initialization request) to the base address register 511 of the I/O card, the I/O card sharing module 450 writes the PCI transaction main body 461 and the header information 451 into the memory space 603x which corresponds to the I/O card to be accessed and the requester server.

After that, when the PCI transaction received from the switch 250 corresponds to the above A) (writing to the command register 512), the I/O card sharing module 450 interrupts the CPU 602 of the I/O processor blade 650 so as to activate the interruption processing unit 620.

The interruption processing unit 620 writes the header information 451 and PCI transaction main body 461 which are written in advance into the memory space 603x, based on the address of the memory space 603x included in the interruption instruction provided by the I/O card sharing module 450. When the PCI transaction main body 461 includes a DMA transfer command, the interruption processing unit 620 temporarily converts the header information 451 and the MM I/O base address 462 included the PCI transaction main body 461 as described later, to write the MM I/O base address thus converted, into the address register 511 of the I/O card to be activated.

Next, the interruption processing unit 620 writes an instruction (for example, a DMA transfer starting instruction) included in the PCI transaction main body 461 which has been interrupted, into the command register 512 of the I/O card which corresponds to the destination 452 of the header information 451, to thereby activate the operation of the I/O card.

Next, the following explanation is given regarding the address conversion described above to be performed by the interruption processing unit 620 in the case of the DMA transfer.

As shown in FIG. 25, according to PCI-EXPRESS or PCI, 64 bits (0 to 63 bit in the drawing) are defined as the MM I/O address space of the PCI transaction. Also, as regards the CPU 101 of each of the servers #1 to #n (server blades 10-1 to 10-n), a CPU capable of addressing with 64 bits is becoming increasingly common. It is not realistic, however, to provide the server blades 10-1 to 10-n each with the memory 102 that fully occupies the address space of 64 bits, and therefore, the memory space with several tens of GB at maximum is usually provided under present circumstances. Accordingly, a predetermined value of less than 64 bits, for example, 52 bits (0 to 51 bit), is defined as a used area shown in FIG. 25 for the address bus of the CPU 101 or the like.

Therefore, while the MM I/O address space has 64 bits defined thereto, the significant bits of the address space are unused when the memory is installed in each of the server blades 10-1 to 10-n.

As described above, in FIG. 25, the significant bits of 52 to 63 bits constitute an unused area 463 in the MM I/O base address 462 included in the PCI transaction main body 461 when 52 of the less significant bits are defined as an accessible address space. The unused area 463 of FIG. 25 includes 12 bits, while the blade server system may include several tens of server blades, so it is possible to identify all the servers in the casing by using at least 6 bits, for example, of the 12 bits in the unused area.

On the other hand, in the case of the I/O card conforming to PCI-EXPRESS, it is impossible to make identification of the plurality of servers #1 to #n on the I/O card side. Once the DMA transfer is started, the I/O card only recognizes the MM I/O base address 462 on initialization, which makes it impossible to perform the DMA transfer to the plurality of servers #1 to #n.

Therefore, according to this invention, in the case of the DMA transfer, the unused significant bits of the MM I/O base address 462 of the PCI transaction are used for storing the server identifier (address information), and the interruption processing unit 620 of the I/O processor blade 650 buries the requester 453 serving as the server identifier in the unused significant bits of the MM I/O base address 462, to thereby perform address conversion.

Then, the interruption processing unit 620 writes the MM I/O address 462 thus converted in the base address register 511 of the I/O card, and writes the start of the DMA transfer in the command register 512, to thereby starts DMA of the I/O card.

After the DMA transfer is started by the I/O card, the transaction decoder 404 of the I/O card sharing module 450 extracts, upon receiving the PCI transaction from the I/O card, the server identifier buried in the unused area 463 which is the significant bits of the MM I/O base address 462, and writes the server identifier thus extracted in the destination 452 of the header information 451 in the PCI transaction. Then, the transaction decoder 404 writes "0" in the area from which the server identifier was extracted in the MM I/O base address 462, to thereby delete the route information of the requester buried in the area. After that, the transaction decoder 404 transfers the PCI transaction to the switch 250. The switch 250 further transfers the PCI transaction to a server designated as the destination based on the header information of the PCI transaction, that is, one of the servers #1 to #n which has requested the DMA transfer.

In other words, the interruption processing unit 620 of the I/O processor blade 650 writes in the address register 511 of the I/O card the address of the requester 453 buried as a server identifier in the unused area 463 of the MM I/O, thereby activating the DMA transfer of the I/O card. Accordingly, with respect to the DMA transfer outputted from the I/O card, the server identifier is extracted from the unused area 463 of the MM I/O base address 462 in the PCI transaction by the I/O card sharing module 450 to set the server identifier in the destination 452 of the header information 451. Thus, the I/O card can be shared by the I/O card sharing module 450 and the I/O processor blade 650 even when the I/O card itself does not have a function of identifying the plurality of servers #1 to #n.

(I/O Card Sharing Processing)

Figure 31:
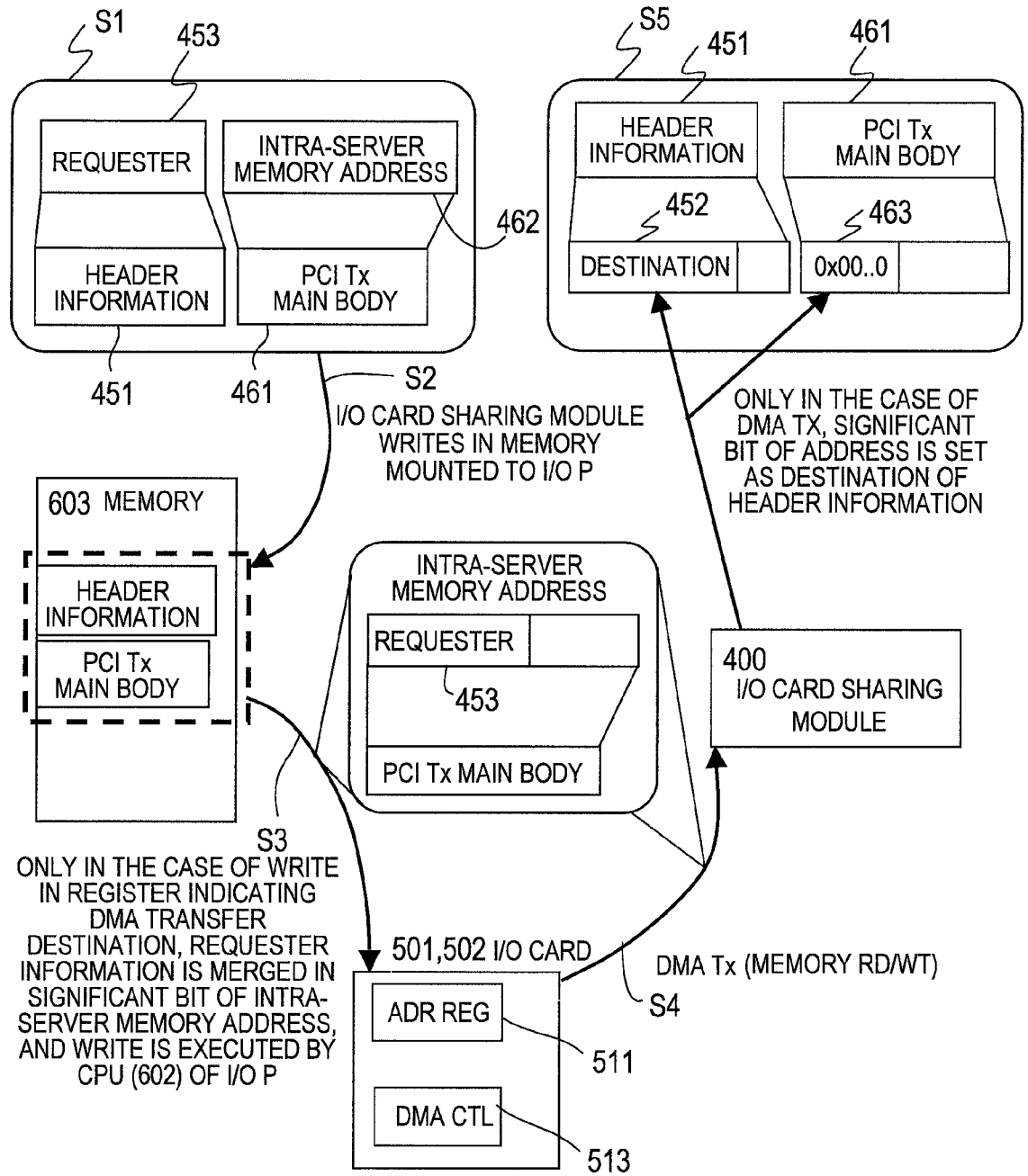
FIG. 31 is an explanatory diagram showing the flow of I/O card sharing processing according to the third embodiment of this invention.

Next, FIG. 31 shows processing of I/O card sharing, mainly through a PCI transaction, by the I/O card sharing module 450 and the I/O processor blade 650.

As shown in FIG. 31, in S1, the servers #1 to #n each set a DMA initialization command or the like in the PCI transaction to send the PCI transaction to the I/O card making I/O access. Each of the servers #1 to #n sets address information (server identifier) of its own in the requester 453 of the header information 451 of the PCI transaction, and sets the MM I/O base address allocated for the I/O card by each of the servers as the MM I/O base address 462.

In S2, when the I/O card sharing module 450 provided between the I/O card and the servers receives the PCI transaction, the PCI transaction is written in the memory space 603x of the I/O processor blade 650 because the PCI transaction includes the DMA initialization command containing the write command to the address register 511 of the I/O card. At this time, the I/O card is not accessed.

In S3, when the servers #1 to #n each send the PCI transaction instructing the start of the DMA transfer to the I/O card, the I/O card sharing module 450 interrupts the I/O processor blade 650 to activate the interruption processing unit 620 because the PCI transaction includes a command to activate the operation of the I/O card.

The interruption processing unit 620 reads the MM I/O base address 462 from the PCI transaction written in the memory space 603x, and writes the MM I/O base address 462 in the address register 511 of the I/O card. At this time, the interruption processing unit 620 buries the requester 453 of the header information 451 indicating the requester server in the unused area 463 of the MM I/O base address 462 within the PCI transaction. Then, the interruption processing unit 620 writes start of the DMA transfer in the command register 512 of the I/O card to activate the operation of the I/O card.

In S4, the I/O card performs the DMA transfer (write or read) with respect to the MM I/O base address set in the address register 511.

In the PCI transaction by DMA from the I/O card, the server identifier is buried in the unused area 463 set as the significant bit of the MM I/O base address 462.

In S5, upon reception of the PCI transaction, the I/O card sharing module 450 provided between the I/O card and the servers #1 to #n judges, by the transaction decoder 404 shown in FIG. 24, whether or not the PCI transaction is performed by DMA.

The judgment on whether or not the PCI transaction from the I/O card is performed by DMA by the transaction decoder 404 is carried out as follows. When all the bits of the unused area 463 of the MM I/O base address 462 are not "0", it is judged that the server identifier is buried to thereby judge that the PCI transaction is performed by DMA.

In the case of the PCI transaction by DMA, the transaction decoder 404 sets the contents of the unused area 463 of the MM I/O base address 462 in the destination 452 of the header information 451, and converts the contents thereof into identifiable address information of the servers #1 to #n by the switch 250. After that, the transaction decoder 404 sets all the bits of the unused area 463 to "0" and sends the PCI transaction to delete the contents of the unused area 463.

Based on the destination 452, the switch 250 transfers the PCI transaction by DMA to the requester server of DMA set in the destination 452, and makes predetermined access with respect to the MM I/O set as the servers #1 to #n.

As described above, the server identifier requesting DMA (requester 453) is set in the predetermined significant bit of the MM I/O base address set in the address register 511 of the I/O card. Therefore, even a general-purpose I/O card can be shared by the plurality of server blades 10-1 to 10-n because the I/O card sharing module 450 replaces information stored in the destination 452 of each of the PCI transactions with address information of the server requesting DMA even when DMA is repeatedly made.

Figure 32:
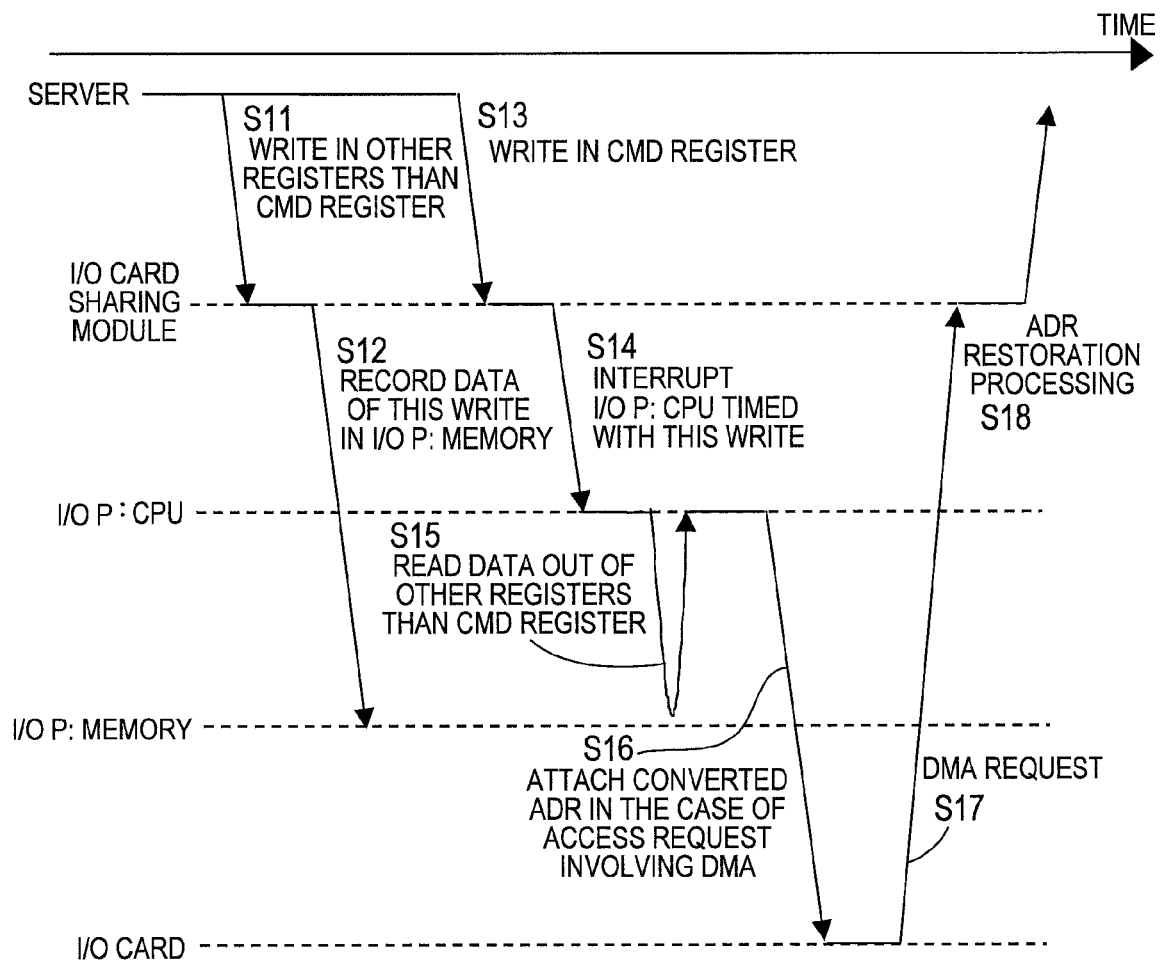
FIG. 32 is a time chart showing the flow of the I/O card sharing processing according to the third embodiment of this invention.

A time chart of FIG. 32 shows the above-mentioned processing in time series. First, in S11, each of the servers #1 to #n sets the DMA initialization command or the like in the PCI transaction and sends the PCI transaction to the I/O card making the I/O access.

In S12, the I/O card sharing module 450 writes the contents of the PCI transaction in the memory space of the I/O processor blade 650 since the PCI transaction includes a write request with respect to the registers other than the command register 512 of the I/O card.

Next, in S13, each of the servers #1 to #n sets a write command to the command register 512 such as the DMA transfer start command in the PCI transaction, and sends the PCI transaction to the I/O card making the I/O access.

In S14, because the PCI transaction includes the write command to the command register 512 of the I/O card, the I/O card sharing module 450 requests interruption to the CPU 602 of the I/O processor blade 650.

In S15, the CPU 602 of the I/O processor blade 650 activates the interruption processing unit 620 and reads out the contents other than those of the command register 512, that is, the contents of the address register 511 or the like.

In S16, when the contents of the PCI transaction read by the interruption processing unit 620 are processed by DMA, the requester 453 of the header information 451 is set in the unused area 463 of the MM I/O base address 462. Then, the MM I/O base address 462 subjected to address conversion is written in the address register 511 of the I/O card, thereby activating the operation of the I/O card by writing the DMA transfer start command in the command register 512.

In S17, the DMA controller 513 of the I/O card makes the DMA access to the memory space of the address register 511.

In S18, upon reception of the PCI transaction from the I/O card, the transaction decoder 404 judges whether the PCI transaction is performed by DMA in the manner described above. When judging that the PCI transaction is performed by DMA, the transaction decoder 404 carries out the conversion of the address information (rebuilding processing) by setting the server identifier of the unused area 463 of the MM I/O base address 462 of the PCI transaction main body 461 in the destination 452 of the header information 451. Then, the transaction decoder 404 sends the PCI transaction to the server requesting DMA via the switch 250.

The above-mentioned procedure allows the DMA controller 513 of the I/O card to execute the processing by burying the identifier of the server requesting DMA in the unused area 463 of the MM I/O base address 462. Thus, a single I/O card can be shared by the plurality of servers #1 to #n.

(Setting Processing of Address Information)

Figure 33:
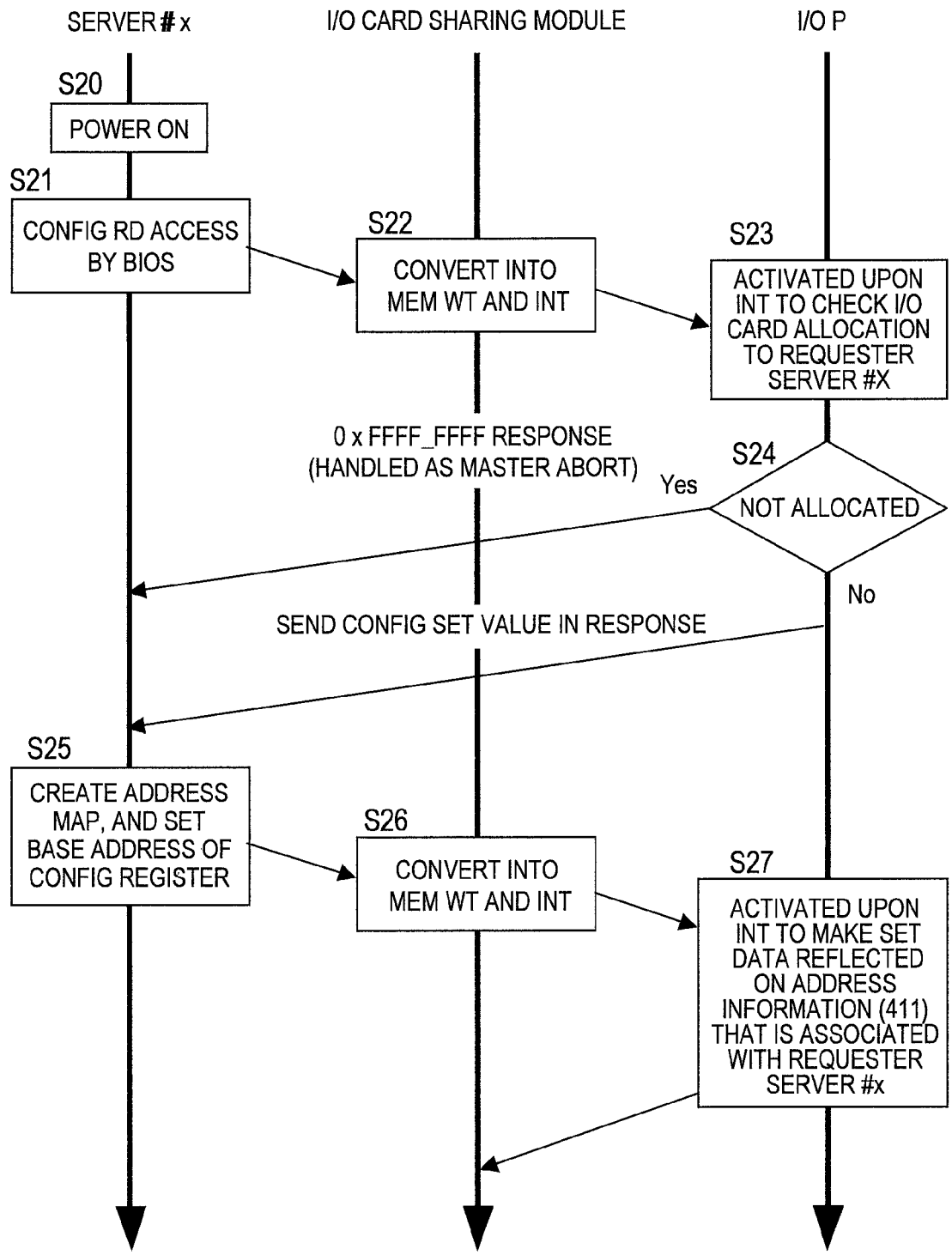
FIG. 33 is a time chart showing an example of address information setting processing, which is executed when a server blade is activated according to the third embodiment of this invention.

Next, FIG. 33 shows a time chart illustrating an example of a setting processing of an address information table 411 executed when server blades 10-1 to 10-n are activated.

The address information table 411 stored in the content addressable memory (CAM) 410 is updated by the processing shown in FIG. 33 every time the server blades 10-1 to 10-n are activated. It should be noted that a case where a server blade 10-1 is activated will be described below.

First, the server blade 10-1 is tuned on in S20. In S21, by turning the power of the server blade 10-1 on, the CPU 101 activates a BIOS (not shown) and requests read with respect to the configuration register of each of the I/O cards in order to perform initialization of the I/O card (device).

In S22, upon reception of the read request of the configuration register of the I/O card, the transaction decoder 402 of the I/O card sharing module 450 interrupts the CPU 602 of the I/O processor blade 650, and writes the PCI transaction including the read request of the configuration register in the memory 603 as described above. At this time, because the MM I/O is not set yet in the server blade 10-1 from which the read request of the configuration register has been sent, the transaction decoder 402 writes the read request in the address set in advance.

In S23, the CPU 602 of the I/O processor blade 650 activates the initialization processing unit 630 shown in FIG. 30 by the interruption of the transaction decoder 402. The initialization processing unit 630 confirms the I/O card allocated to the server blade by reading the I/O card sharing settings table 610 from the read request of the configuration register written to the predetermined address.

In S24, when the I/O card is not allocated to the server blade 10-1 (access prohibition), the initialization processing unit 630 notifies the server blade 10-1 that the allocation is not made via the I/O card sharing module 450 (handled as master abort). On the other hand, when the I/O card is allocated to the server blade 10-1, the initialization processing unit 630 reads the contents of the configuration register of the I/O card and responds to the server blade 10-1. It should be noted that the processing of S24 is executed sequentially for every I/O card set in the I/O card sharing settings table 610.

In S25, upon reception of the contents of the configuration register of the I/O card from the I/O processor blade 650, the server blade 10-1 sets the MM I/O space or the I/O space based on the obtained information of the I/O card, and performs setting or the like of the MM I/O base address. Then, the server blade 10-1 notifies the MM I/O base address to the I/O card. The notification is executed for each I/O card.

In S26, the I/O card sharing module 450 receives the PCI transaction notifying the MM I/O base address from the server blade 10-1. Because the PCI transaction includes the setting notification of the MM I/O base address, the I/O card sharing module 450 interrupts the CPU 602 of the I/O processor blade 650, and then writes the PCI transaction notifying the MM I/O base address in the memory 603. It should be noted that the processing is performed in the same manner as in S22.

In S27, the CPU 602 of the I/O processor blade 650 activates the initialization processing unit 630 by the interruption of the transaction decoder 402. The initialization processing unit 630 allocates the memory space 6031 associated with the I/O card of the server blade 10-1 to the memory 603 in response to the setting notification of the MM I/O base address of the server blade 10-1 written to the predetermined address. Then, the initialization processing unit 630 notifies the MM I/O base address and the offset of the server blade 10-1, the address of the memory space 6031 of the I/O processor blade 650, the address information of the allocated I/O card, and the address information of the server blade 10-1 to the I/O card sharing module 450, to thereby reflect those addresses in the address information table 411 of the CAM 410. It should be noted that the processing of S27 is repeatedly executed for each I/O card used by the server blade 10-1.

By the processing described above, direct access is not made by the activated server blades 10-1 to 10-n to the I/O cards 501 and 502 shared by the plurality of server blades 10-1 to 10-n. Further, the I/O processor blade 650 obtains the contents of the configuration register as a substitute, and performs setting or the like of the memory space 603x. In the blade server system, a new server blade can be provided and activated when the other server blades are being operated. In such the case, the I/O processor blade 650 responds in place of the I/O card at the time of activation of the new server blade, thereby making it possible to activate the new server blade without influencing the I/O access of the other server blades being operated.

It should be noted that the case where the server blade is activated by the BIOS mounted thereto is described above. However, the processing can be performed in the same manner as described above even in the case of activating the server blade by an extensible firmware interface (EMI) (not shown).

(I/O Card Sharing Settings Table)

Hereinafter, the I/O card sharing settings table 610 shown in FIG. 29 will be explained.

As described above, the I/O card sharing settings table 610 shows which one of the I/O cards is allocated to which server, and the administrator suitably performing settings thereof from the console 5 or the like. The attributes of the I/O cards, that is, "shared", "exclusive", and "access prohibited" with respect to the servers #1 to #n are displayed on a display of the console 5 at an interface shown in FIG. 29, and may be set by the interface such as a mouse and a keyboard (not shown).

The identifier 611 of the I/O card sharing settings table 610 is suitably set by the administrator each time the I/O card is added or changed. In addition, the type 612 indicating functions or the like of the I/O card can be set in the table by reading a class code and a subclass code of the configuration register of the I/O card.

With regard to the allocation states 613 to 615 of respective servers #1 to #3, the administrator suitably sets the presence/absence of the sharing and the presence/absence of the allocation based on the characteristics, performance, and the like of the servers #1 to #3 and the I/O cards. In FIG. 29, "shared" is set when the I/O card is allocated to the plurality of servers to be shared thereby, and "not allocated" is set when no allocation is made. When the card is exclusively used by a single server, "exclusive" is set and access to this I/O card from other servers is prohibited. The server whose I/O card allocation is set to "not allocated" is denied of access to the I/O card when accessing the I/O card. When the type of the denied access is a read access, the I/O card sharing module 450 makes a response on data whose every bit is 1, and when the access is a write access, the I/O card sharing module 450 notifies of the master abort.

The I/O card sharing settings table 610 is reflected on the I/O card sharing settings 405 of the I/O card sharing module 450. Then, the second transaction decoder 403 managing the PCI transaction from the I/O processor blade 650 to the I/O card permits only the valid transaction and prohibits illegal transaction, that is, access by the servers to which the I/O cards are not allocated in the I/O card sharing settings table 610, based on the I/O card sharing settings 405.

By the I/O card sharing settings table 610, all the I/O cards can be shared. However, a single I/O card is exclusively used by a certain server and the other I/O card may be shared by servers to secure throughput or the like. Accordingly, "shared" and "exclusive" of the I/O card can be present at the same time and it becomes possible to flexibly structure the I/O device of the blade server system, whereby the resources of the I/O device can be efficiently used.

Fourth Embodiment

Figure 34:
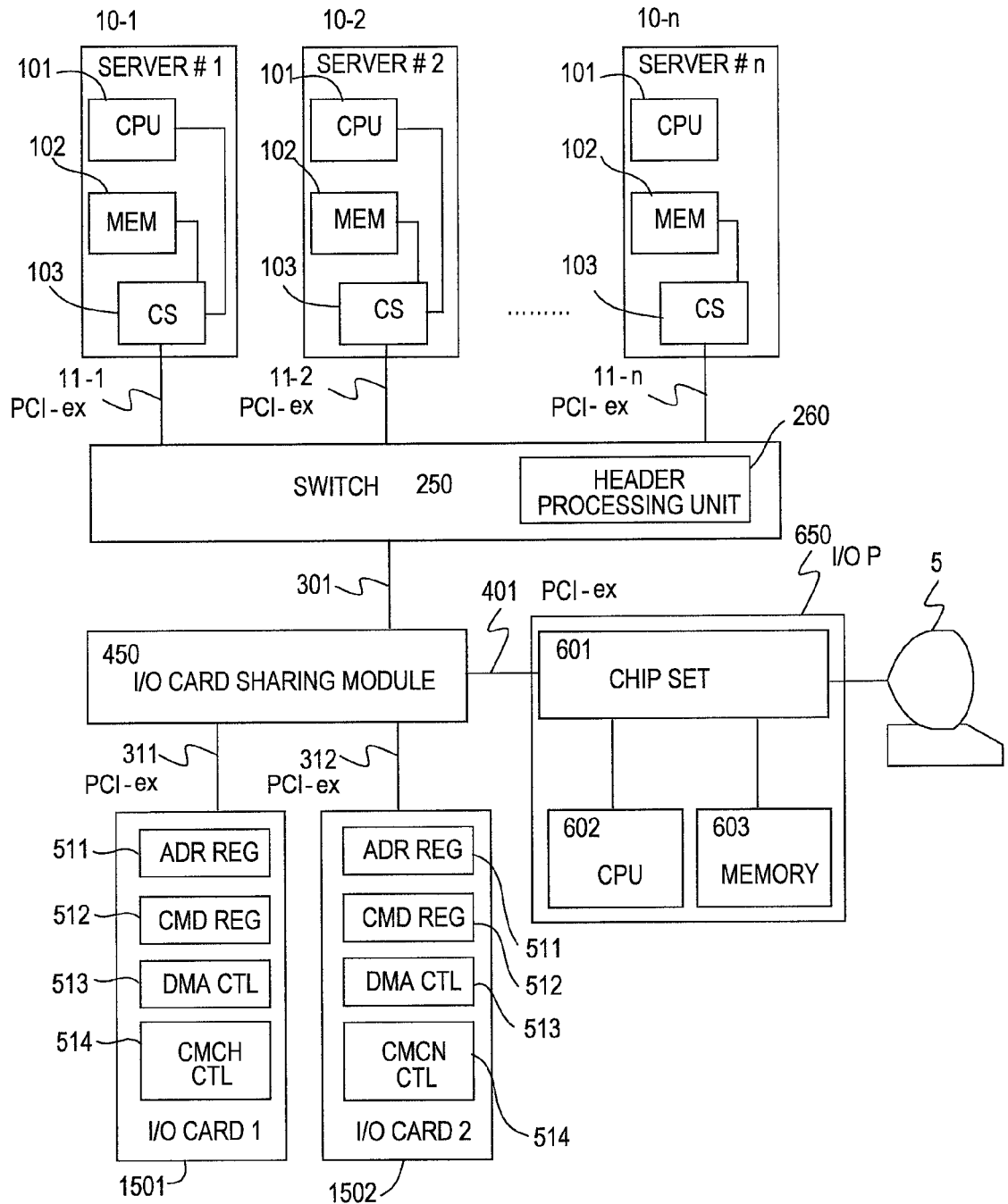
FIG. 34 is a block diagram of a blade server system according to a fourth embodiment of this invention.

FIG. 34 is a block diagram of a blade server system according to a fourth embodiment of this invention. In the blade server system of the fourth embodiment, a command chain control unit 514 is additionally provided to the I/O card of the third embodiment. In addition, the blade server system is composed of I/O cards 1501 and 1502 for performing I/O processing by sequentially reading a data structure set in a memory 102 of each of servers #1 to #n. Other structures thereof are the same as those of the third embodiment.

Each of the I/O cards 1501 and 1502 sequentially reads the data structure set in the memory 102 of each of the server blades 10-1 to 10-n and performs an I/O operation in accordance with the description of each of the data structures. In other words, each of the I/O cards 1501 and 1502 performs a so-called command chain processing.

Figure 35:
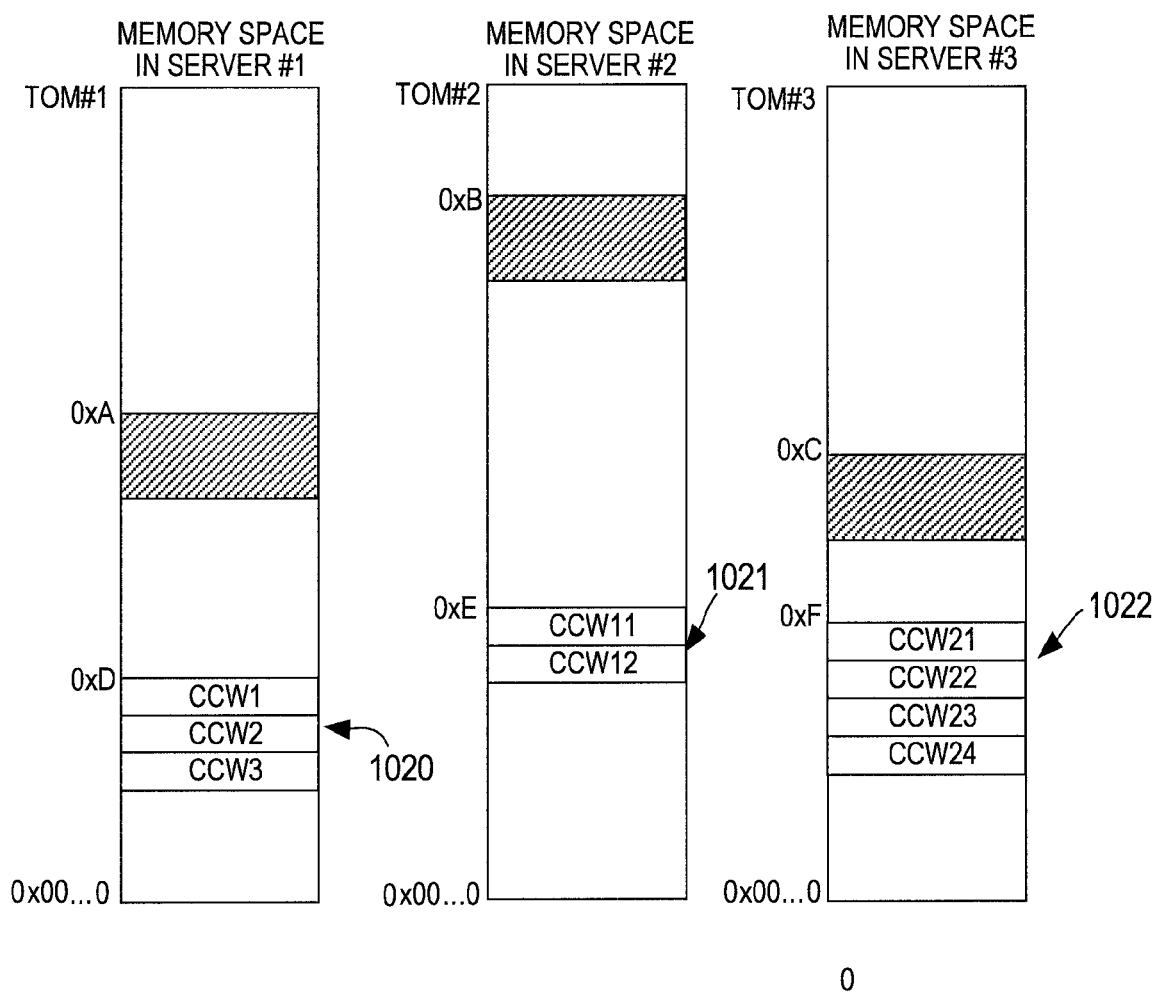
FIG. 35 is an explanatory diagram of a memory space in a server according to the fourth embodiment of this invention.

As shown in FIG. 35, the servers #1 to #n operated by the server blades 10-1 to 10-n each set data structures 1020 to 1022 in the predetermined address in the memory space of each of the servers #1 to #n in using the I/O cards.

For example, three data structures 1020 (CCWs 1 to 3) are set in the address 0xD in the memory space of the server #1, two data structures 1021 (CCWs 11 and 12) are set in the address 0xE in the memory space of the server #2, and four data structures 1022 (CCWs 21 to 24) are set in the address 0xF in the memory space of the server #3. It should be noted that each of those data structures is suitably set by the OS or the application of each of the servers #1 to #3.

A flag indicating the presence of subsequent data structure is set in the head and intermediate data structures. For example, the flag indicating the presence of subsequent data structure is set in the CCWs 1 and 2 of the data structure 1020, and the flag is not set in the CCW 3, which indicates that the CCW 3 is the final data structure.

Each of the servers #1 to #3 sends a command to activate the operation to the I/O card 1501 or 1502 to be used, and notifies the I/O card 1501 or 1502 of the addresses of the data structures 1020 to 1022 set in each of the memory spaces.

Upon reception of the address set in the memory spaces along with the command of activation from each of the servers #1 to #n, each of the I/O cards 1501 and 1502 reads the data structure in the specified memory space to execute I/O access written in the data structures 1020 to 1022.

An example is shown below in which an I/O card sharing module 450 and an I/O processor blade 650 identical to those of the third embodiment are applied to the blade server system equipped with the I/O cards 1501 and 1502 for performing the command chain processing described above.

Figure 36:
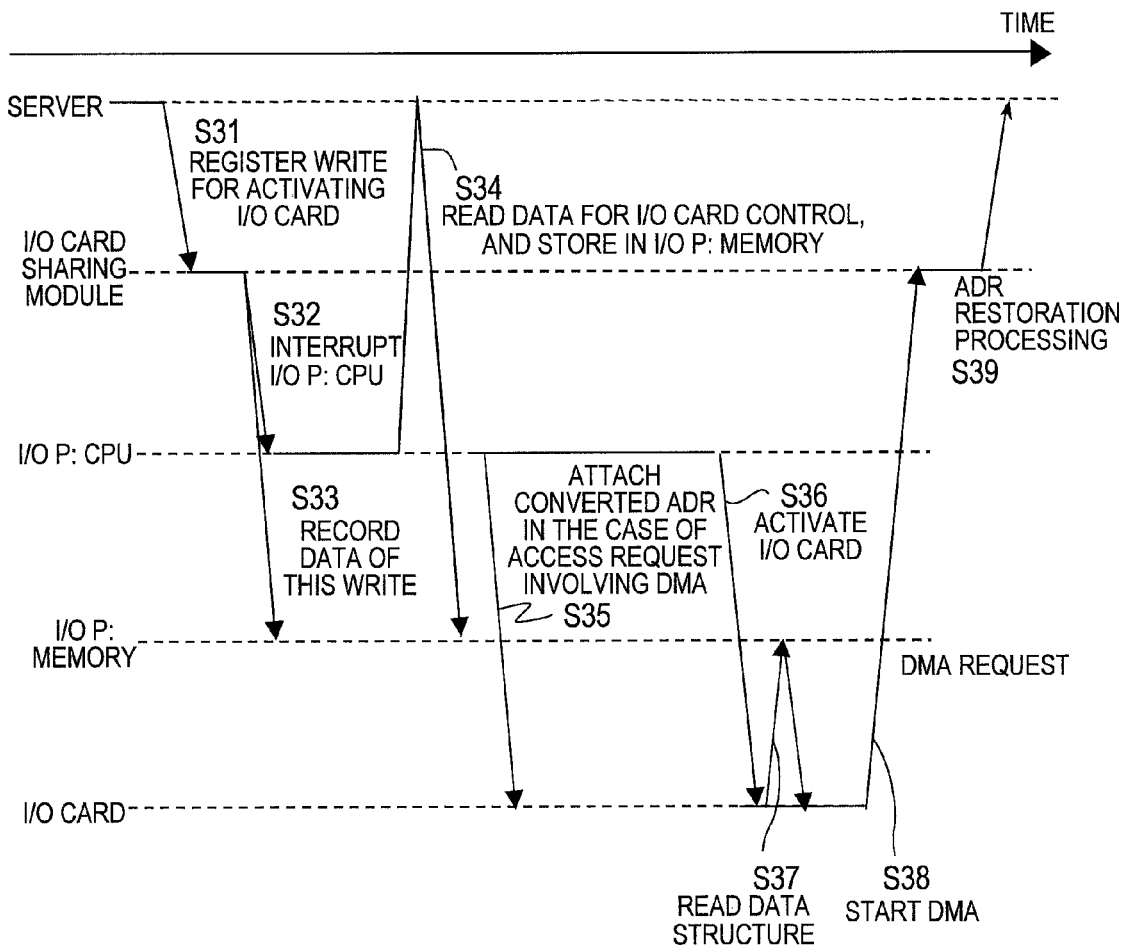
FIG. 36 is a time chart showing the flow of I/O card sharing processing according to the fourth embodiment of this invention.

FIG. 36 is a time chart showing a sharing processing of the I/O cards by the I/O card sharing module 450 and the I/O processor blade 650. It should be noted that a case where the server #1 (server blade 10-1) uses the I/O card 1501 will be explained below.

First, the server #1 sends a PCI transaction instructing to activate the operation to the I/O card 1501 for making the I/O access (S31). Through the PCI transaction, an MM I/O base address allocated to the I/O card 1501 by the server #1 is set as the MM I/O base address 462. Further, the command instructing to activate the operation and the address 0xD of the data structure 1020 are set in the PCI transaction main body 461.

Upon reception of the PCI transaction from the server #1, the I/O card sharing module 450 analyzes the command of the PCI transaction. Because the command to activate the operation is a write command to the command register 512 of the I/O card 1501, the I/O card sharing module 450 interrupts the CPU 602 of the I/O processor blade 650 (S32). At the same time, the I/O card sharing module 450 writes contents of the PCI transaction in the predetermined memory space 6031 of the I/O processor blade 650 as shown in FIG. 27 (S33).

Figure 37:
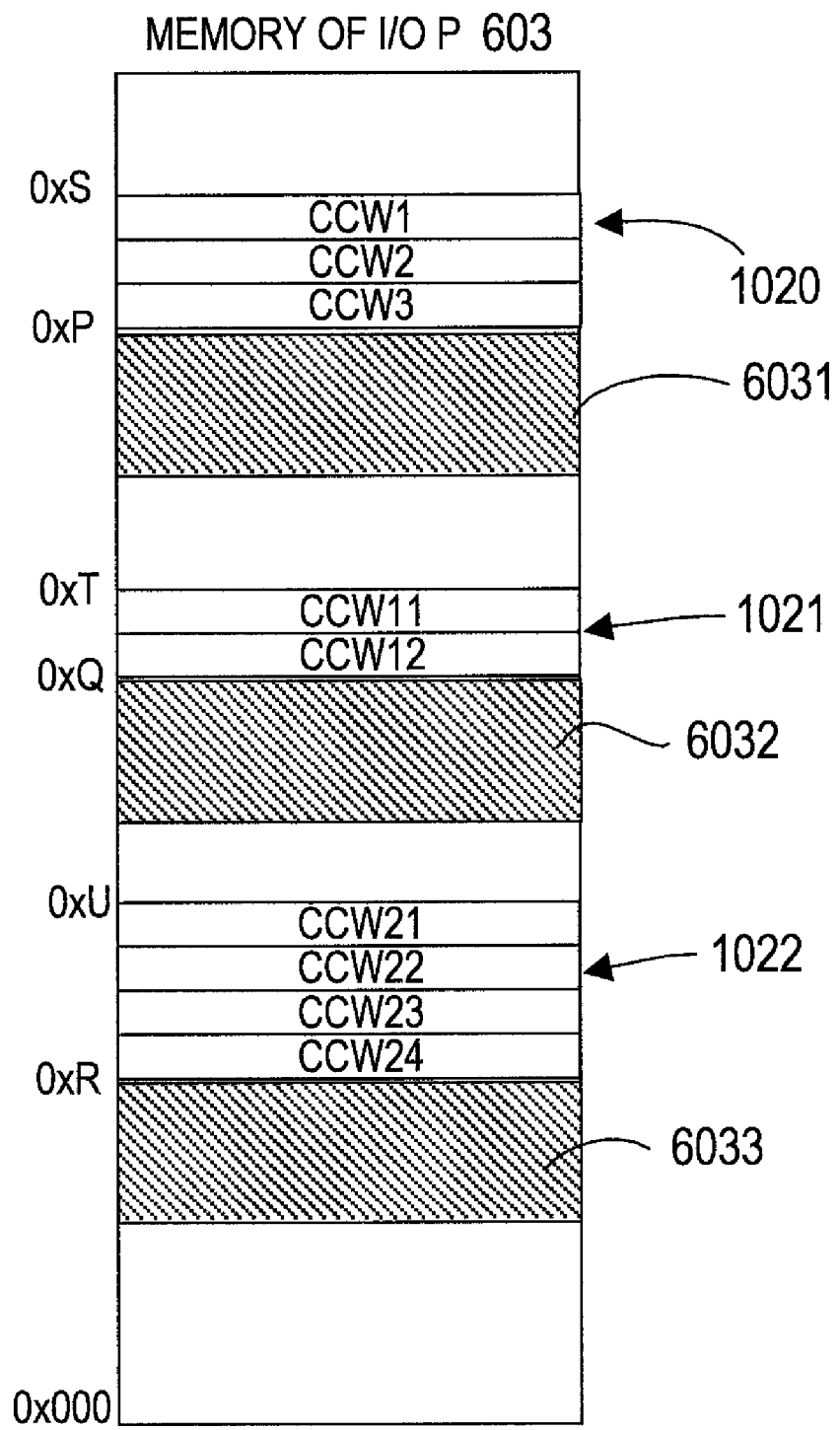
FIG. 37 is an explanatory diagram of a memory space in an I/O processor blade according to the fourth embodiment of this invention.

The CPU 602 activated by the interruption activates the interruption processing unit 620 of the third embodiment. Then, the interruption processing unit 620 reads the address 0xD of the data structure 1020 of the PCI transaction written in the memory space to obtain the requester 453 of the MM I/O base address 462. Next, the interruption processing unit 620 reads the data structure 1020 from the address obtained with respect to the memory 102 of the sever #1 of the requester 453, and copies the data structure 1020 in the predetermined memory space of the I/O processor blade 650 (S34). It should be noted that, as shown in FIG. 37, each of the memory spaces is an area provided for storing the data structure set in advance for each of the servers #1 to #n. In this example, addresses 0xS, 0xT, and 0xU are set as the memory spaces for the data structure of each of the servers #1 to #3, and the data structure 1020 of the server #1 is stored in the address starting from 0xS as shown in FIG. 37.

Next, the interruption processing unit 620 executes processing of the MM I/O used in DMA or the like. The requester 453 of the header information 451 set in the unused area 463 of the MM I/O base address 462 through the PCI transaction written in the memory space 6031 is written in the address register 511 of the I/O card 1501 as the target, thereby executing an address conversion (S35).

After that, the interruption processing unit 620 writes the command to activate the operation in the command register of the I/O card 1501 and notifies the command register of the address 0xS of the data structure 1020 to the command chain control unit 514, based on the command of the received PCI transaction to activate the operation of the I/O card (S36).

The I/O card 1501 is activated based on the activation command of the interruption processing unit 620, and reads one data structure (CCW 1) 1020 from the address 0xS of the memory 603 of the I/O processor blade 650 received (S37). With respect to the communication from the I/O card 1501 to the I/O processor blade 650, the I/O card sharing module 450 performs the transfer as it is.

The I/O card 1501 performs the I/O operation in accordance with the description of the data structure 1020. For example, when the read data structure 1020 is processed by DMA, the I/O card 1501 executes DMA transfer with respect to the MM I/O base address set in the address register 511 (S38). In the PCI transaction by DMA from the I/O card, a server identifier is buried in the unused area 463 set as the significant bit of the MM I/O base address 462.

Upon reception of the PCI transaction, the I/O card sharing module 450 provided between the I/O card 1501 and the server #1 judges whether or not the PCI transaction is performed by DMA by the transaction decoder 404 shown in FIG. 24.

The judgment on whether the PCI transaction from the I/O card is performed by DMA by the transaction decoder 404 is carried out as follows. When all bits of the unused area 463 of the MM I/O base address 462 are not "0", it is judged that the server identifier is buried and that the PCI transaction is performed by DMA.

In the case of the PCI transaction by DMA, the transaction decoder 404 sets the contents of the unused area 463 of the MM I/O base address 462 in the destination 452 of the header information 451, and converts the contents thereof into identifiable address information of the servers #1 to #n by the switch 250. After that, the transaction decoder 404 sets all the bits of the unused area 463 to "0" and sends the PCI transaction to delete the contents of the unused area 463 (S39).

Based on the destination 452, the switch 250 transfers the PCI transaction by DMA to the requester server of DMA set in the destination 452, and makes predetermined access with respect to the MM I/O set as the servers #1 to #n.

When the I/O operation specified by the data structure (CCW 1) 1020 is completed, the I/O card 1501 reads the subsequent data structure (CCW 2) from the specified address 0xS of the memory 603 of the I/O processor blade 650 to execute the operation in the same manner as described above.

Thus, in the case of the I/O cards 1501 and 1502 for performing the command chain processing, the data structures 1020 to 1022 of respective servers #1 to #3 are copied to the memory space of the memory 603 of the I/O processor blade 650, whereby the I/O processor blade 650 responds to the read request from the I/O cards 1501 and 1502 in place of each of the servers #1 to #3.

Therefore, by notifying the I/O card of the addresses of the memory 603 storing the data structures 1020 to 1022 of the servers requesting the I/O access at the time of activation of the I/O cards 1501 and 1502, it becomes possible for the I/O cards for performing the command chain processing to be shared by a plurality of servers #1 to #3.

Fifth Embodiment

Figure 38:
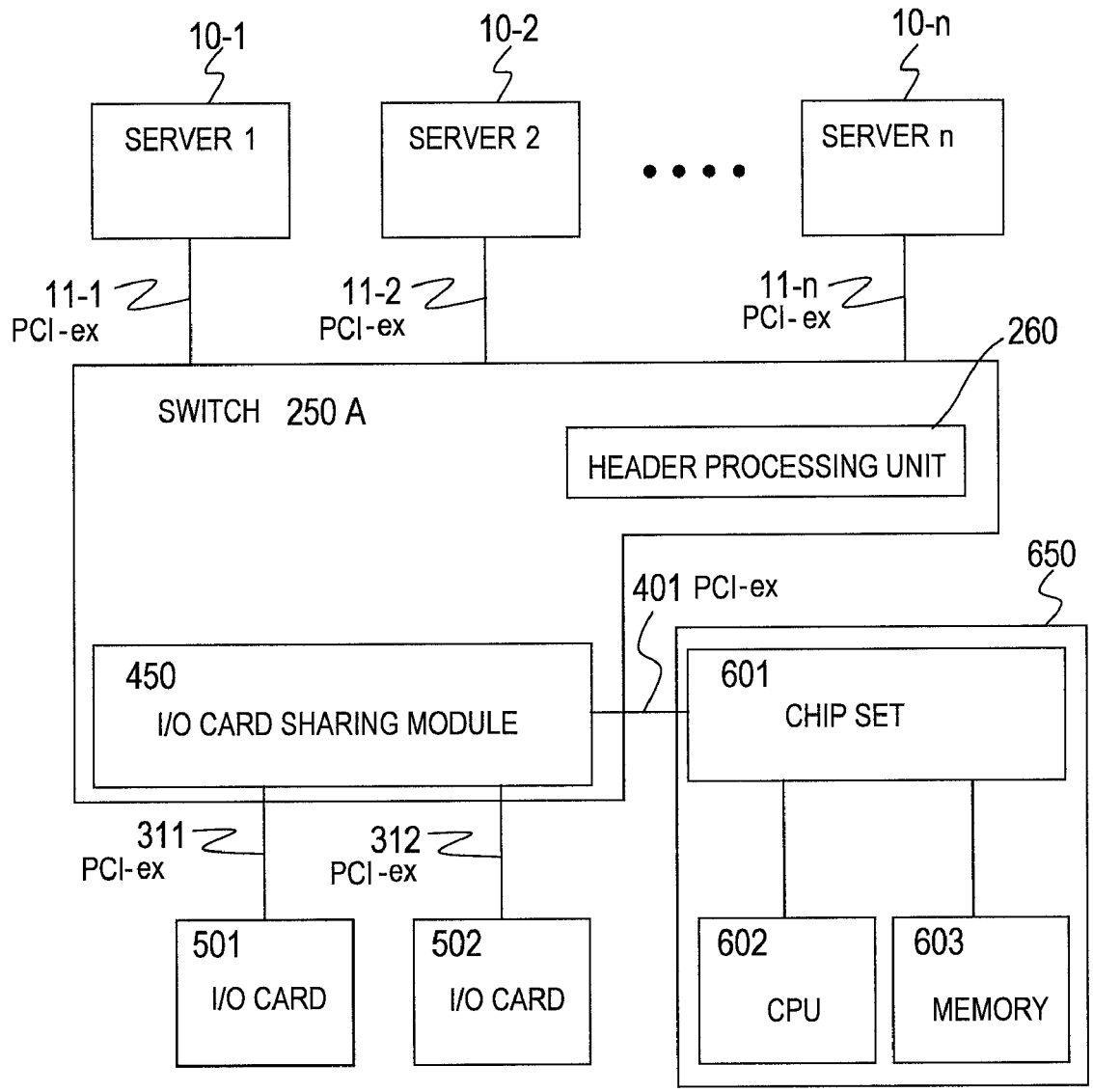
FIG. 38 is a block diagram of a blade server system according to a fifth embodiment of this invention.

FIG. 38 is a block diagram of a blade server system according to a fifth embodiment of this invention. In this embodiment, an I/O card sharing module 450 is incorporated in the switch 250 of the first or fourth embodiment to be integrated therewith.

A switch 250A includes the I/O card sharing module 450 and operates in the manner as described in the first or fourth embodiment. By incorporating the I/O card sharing module 450 in the switch 250A, it becomes possible to reduce the number of slots mounted to the blade server system, and to structure the casing in a compact manner.

SUMMARY

As described above, according to this invention, in the case of performing DMA transfer while sharing a single I/O card by a plurality of server blades 10-1 to 10-n, the I/O processor blade 650 buries in the MM I/O base address the identifier of the server requesting DMA to the address register 511 of the I/O card at the time of start of the DMA transfer, and the I/O card sharing module 450 relaying the PCI transaction to the server from the I/O card replaces the information stored in the destination 452 of the header information 451 with the server identifier buried in the MM I/O base address, thereby making it possible to share an I/O card having a general-purpose bus by the servers.

After the start of the DMA transfer, because the I/O processor blade 650 does not intervene in the transfer of the PCI transaction and hardware such as the I/O card sharing module 450 performs the address conversion, the sharing of the I/O card by the plurality of servers can be realized while preventing the overhead due to software processing and deterioration in performance of the I/O access as in the conventional case.

In addition, the I/O card shared by the plurality of server blades 10-1 to 10-n may be composed of a general-purpose interface, so in performing server integration as described above, the I/O card conventionally used can be used as it is, thereby making it possible to suppress the increase in cost in performing the server integration.

Further, in performing the server integration, a single I/O card can be shared by the plurality of server blades 10-1 to 10-n, so it becomes possible to reduce the number of I/O cards and to use a compact casing while preventing an increase in the number of I/O cards as in the conventional case.

Further, by the I/O card sharing settings table 610, the I/O card shared by the plurality of servers and the I/O card exclusively used by a single server blade can be present at the same time, so it becomes possible to flexibly structure the blade server system.

It should be noted that in the third to fifth embodiments described above, an example in which a PCI-EXPRESS is used as the general-purpose bus is shown. However, general-purpose bus such as a PCI or PCI-X may also be employed.

In addition, in the third to fifth embodiments described above, an example in which one of the server blades 10-1 to 10-n corresponds to one of the servers #1 to #n is shown. However, the server identifier may be set as the logical partition number when each of the servers #1 to #n is configured by the logical partition of the virtual computer.

Further, in the third to fifth embodiments described above, an example is shown in which the I/O processor blade 650 is directly coupled to the I/O card sharing module 450. However, the I/O processor blade 650 may be couple to the switch 250. Further, the server blade may execute the processing of the I/O processor blade 650 in place of the I/O processor blade 650. In the third to fifth embodiments described above, the I/O card sharing module 450 and the I/O processor blade 650 are independent of each other. However, an I/O hub mounted with the I/O card sharing module 450 and the I/O processor blade 650 may be employed as in the first embodiment.

As described above, this invention can be applied to a computer system composed of a plurality of servers and to a chip set thereof.

While the present invention has been described in detail and pictorially in the accompanying drawings, the present invention is not limited to such detail but covers various obvious modifications and equivalent arrangements, which fall within the purview of the appended claims.

What is claimed is:

1. A computer system, comprising:
at least one node composed of at least one processor and memory;
an I/O hub connecting at least one I/O card;
a switch connecting the node and the I/O hub, and
a plurality of logical servers, each being provided with an operating system and run by one or a plurality of the at least one node,
wherein each of the logical servers is set in advance to allow one of exclusive use and shared use of the I/O card connected to the I/O hub via the switch,
wherein the I/O hub allocates a virtual MM I/O address unique to each logical server to a physical MM I/O address associated with each I/O card,
wherein the I/O hub keeps allocation information indicating relation between the allocated virtual MM I/O address, the physical MM I/O address, and a server identifier unique to a logical server corresponding to the allocated virtual MM I/O address, and wherein, when an access request designating the allocated virtual MM I/O address as an access destination is received, the I/O hub refers to the allocation information to extract, from the designated virtual MM I/O address, a corresponding physical MM I/O address to specify the I/O card as an actual access destination of the access request, and to extract the server identifier from the designated virtual MM I/O address; and, based on the extracted server identifier, identifies the a logical server that has issued the access request.

2. The computer system according to claim 1, wherein, when the access request designating the allocated virtual MM I/O address as the access destination is received, the I/O hub sends the server identifier, along with the received access request, to the I/O card, and wherein, when a DMA request is received from the I/O card in response to the access request, the I/O hub extracts the server identifier from the DMA request and, based on the extracted server identifier, identifies a logical server which is an object of the DMA request.

3. The computer system according to claim 2, wherein the I/O hub converts a DMA address contained in the DMA request into an address that is associated with the logical server identified as a logical server which is the object of the DMA request, and wherein the I/O hub executes the DMA request, sent from the I/O card, according to the converted address to transfer data to a memory space allocated to the identified logical server.

4. The computer system according to claim 2, wherein, when the access request designating the allocated virtual MM I/O address as the access destination is received, the I/O hub buries the server identifier in a significant bit of a DMA address contained in the access request, and wherein, when a DMA request is received from the I/O card in response to the access request, the I/O hub extracts the server identifier buried in a significant bit of a DMA address contained in the DMA request, and based on the extracted server identifier, identifies the server to which the DMA request is made.

5. A computer system, comprising:

at least one node composed of at least one processor and memory;

an I/O hub connecting at least one I/O card;

a switch connecting the node and the I/O hub, and a server run by one or a plurality of the at least one node, wherein the server is set in advance to allow one of exclusive use and shared use of the I/O card connected to the I/O hub via the switch, wherein the I/O hub allocates a virtual MM I/O address unique to each server to a physical MM I/O address associated with each I/O card, wherein the I/O hub keeps allocation information indicating relation between the allocated virtual MM I/O address, the physical MM I/O address, and a server identifier unique to the server, wherein, when a request to access the I/O card is received from the server, the I/O hub refers to the allocation information to extract the server identifier from the access request, and based on the extracted server identifier, identifies the server that has issued the access request, wherein, when a request to access the I/O card is received from the server, the I/O hub sends the server identifier, along with the received access request, to the I/O card, wherein, when a DMA request is received from the I/O card in response to the access request, the I/O hub extracts the server identifier from the DMA request, and based on the extracted server identifier, identifies the server to which the DMA request is made, wherein the I/O hub converts a DMA address contained in the DMA request into an address that is associated with the server identified as a server to which the DMA request is made, and wherein the I/O hub transfers the DMA request sent from the I/O card to a memory space in the identified server at the converted address.

6. A computer system, comprising:

at least one node composed of at least one processor and memory;

an I/O hub connecting at least one I/O card;

a switch connecting the node and the I/O hub, and a server run by one or a plurality of the at least one node, wherein the server is set in advance to allow one of exclusive use and shared use of the I/O card connected to the I/O hub via the switch, wherein the I/O hub allocates a virtual MM I/O address unique to each server to a physical MM I/O address associated with each I/O card, wherein the I/O hub keeps allocation information indicating relation between the allocated virtual MM I/O address, the physical MM I/O address, and a server identifier unique to the server, wherein, when a request to access the I/O card is received from the server, the I/O hub refers to the allocation information to extract the server identifier from the access request, and based on the extracted server identifier, identifies the server that has issued the access request, wherein, when a request to access the I/O card is received from the server, the I/O hub sends the server identifier, along with the received access request, to the I/O card, wherein, when a DMA request is received from the I/O card in response to the access request, the I/O hub extracts the server identifier from the DMA request, and based on the extracted server identifier, identifies the server to which the DMA request is made, wherein, when a request to access the I/O card is received from the server, the I/O hub buries the server identifier in a significant bit of a DMA address contained in the access request, and wherein, when a DMA request is received from the I/O card in response to the access request, the I/O hub extracts the server identifier buried in a significant bit of a DMA address contained in the DMA request, and based on the extracted server identifier, identifies the server to which the DMA request is made.

* * * * *